US008661219B2

(12) United States Patent
Miyaji et al.

(10) Patent No.: US 8,661,219 B2
(45) Date of Patent: Feb. 25, 2014

(54) STORAGE DEVICE CONTROL METHOD AND COMPUTER SYSTEM

(75) Inventors: Taiki Miyaji, Yokohama (JP); Takeyuki Imazu, Kamakura (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 877 days.

(21) Appl. No.: 12/146,026

(22) Filed: Jun. 25, 2008

(65) Prior Publication Data

US 2009/0282201 A1   Nov. 12, 2009

(30) Foreign Application Priority Data

May 7, 2008   (JP) ................... 2008-121160

(51) Int. Cl.
    *G01J 5/02*   (2006.01)
(52) U.S. Cl.
    USPC ........... 711/170; 711/161; 711/162; 707/640; 707/642
(58) Field of Classification Search
    USPC .................... 711/161, 162; 707/640, 642
    See application file for complete search history.

(56) References Cited

U.S. PATENT DOCUMENTS

| 6,195,695 | B1 * | 2/2001 | Cheston et al. ............... 709/221 |
| 6,725,394 | B1 * | 4/2004 | Bolt .................. 714/7 |
| 6,859,824 | B1 | 2/2005 | Yamamoto et al. |
| 2001/0004754 | A1 | 6/2001 | Murayama |
| 2003/0149736 | A1 * | 8/2003 | Berkowitz et al. ............ 709/213 |
| 2003/0229768 | A1 * | 12/2003 | Kawano et al. ............... 711/165 |
| 2003/0236970 | A1 * | 12/2003 | Palmer et al. ...................... 713/1 |
| 2005/0289310 | A1 | 12/2005 | Miki |
| 2006/0047660 | A1 | 3/2006 | Ikegaya et al. |
| 2006/0048014 | A1 | 3/2006 | Takahashi et al. |
| 2006/0075190 | A1 | 4/2006 | Higaki et al. |
| 2006/0224845 | A1 | 10/2006 | Hiraiwa et al. |
| 2007/0113025 | A1 | 5/2007 | Ozaki et al. |
| 2007/0201434 | A1 | 8/2007 | Nakamura et al. |
| 2008/0059735 | A1 | 3/2008 | Emaru et al. |

FOREIGN PATENT DOCUMENTS

| EP | 1 589 428 | 10/2005 |
| EP | 1 785 833 | 5/2007 |
| JP | 2000-099277 | 4/2000 |
| JP | 2002-281065 | 9/2002 |
| JP | 2006-072635 | 3/2006 |
| JP | 2006-106980 | 4/2006 |
| JP | 2007-140601 | 6/2007 |
| JP | 2007-219717 | 8/2007 |
| JP | 2007-305161 | 11/2007 |
| JP | 2008-065425 | 3/2008 |

* cited by examiner

*Primary Examiner* — Matthew Bradley
*Assistant Examiner* — Ramon A Mercado
(74) *Attorney, Agent, or Firm* — Foley & Lardner LLP

(57) ABSTRACT

A storage device control method for operating a logical volume to which a control command cannot be issued directly from a host computer is provided. The host computer manages a storage device. The storage device includes a disk device which provides logical volumes and a disk control device which controls the disk device. The host computer issues a control command to a recognized volume in the disk control device. The disk control device operates a recognized volume which is an issue destination of the control command or an unrecognized volume contained in the control command. A logical volume to which the control command is to be issued from the host computer is determined by using definition information (a disk information table, a copy pair information table, or a copy group information table) concerning copy operation retained by storage control software which operates on the host computer.

15 Claims, 21 Drawing Sheets

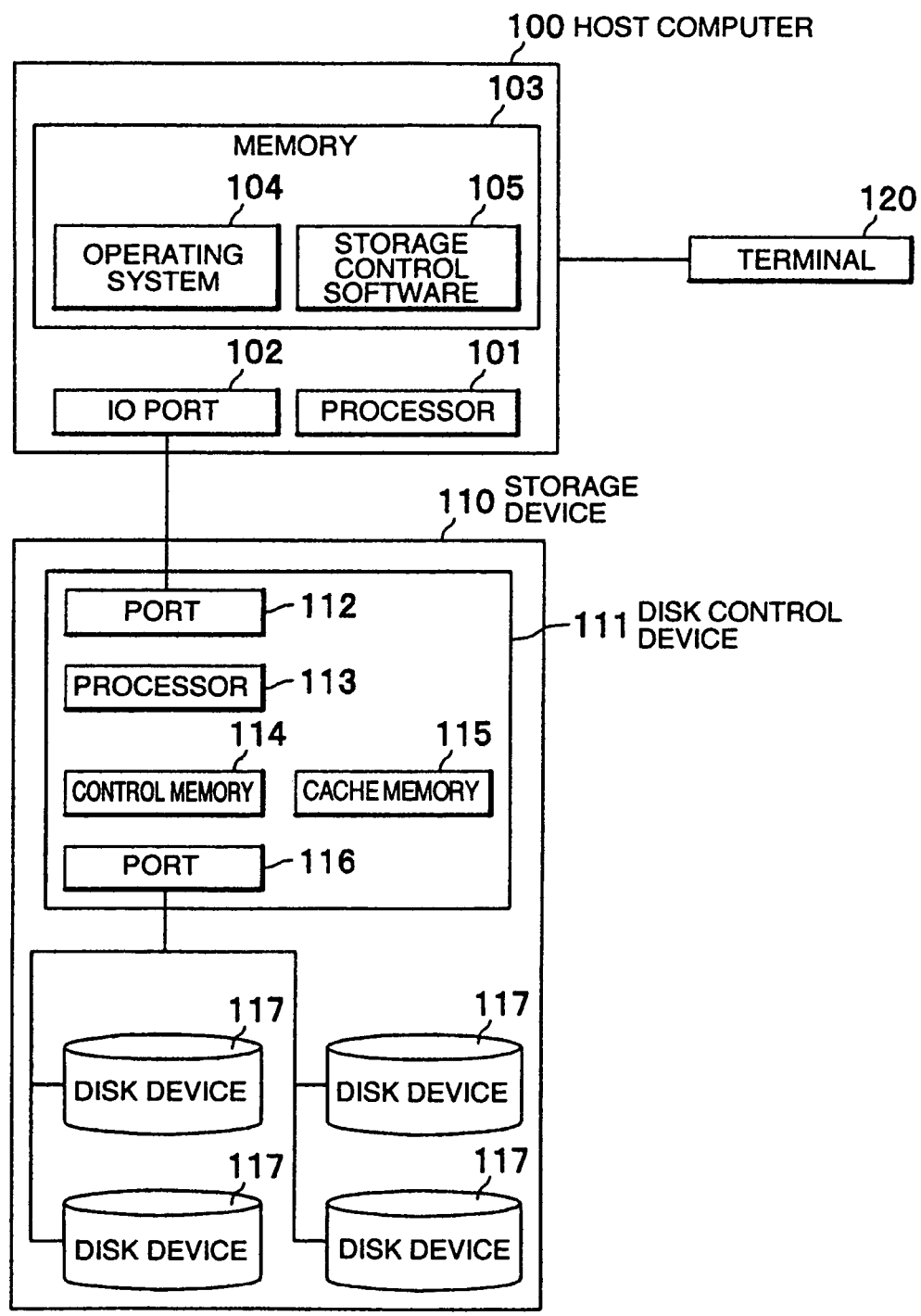

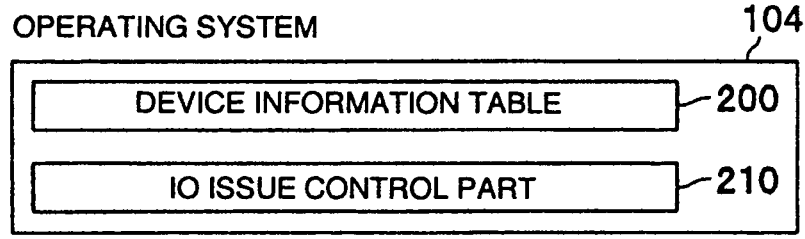
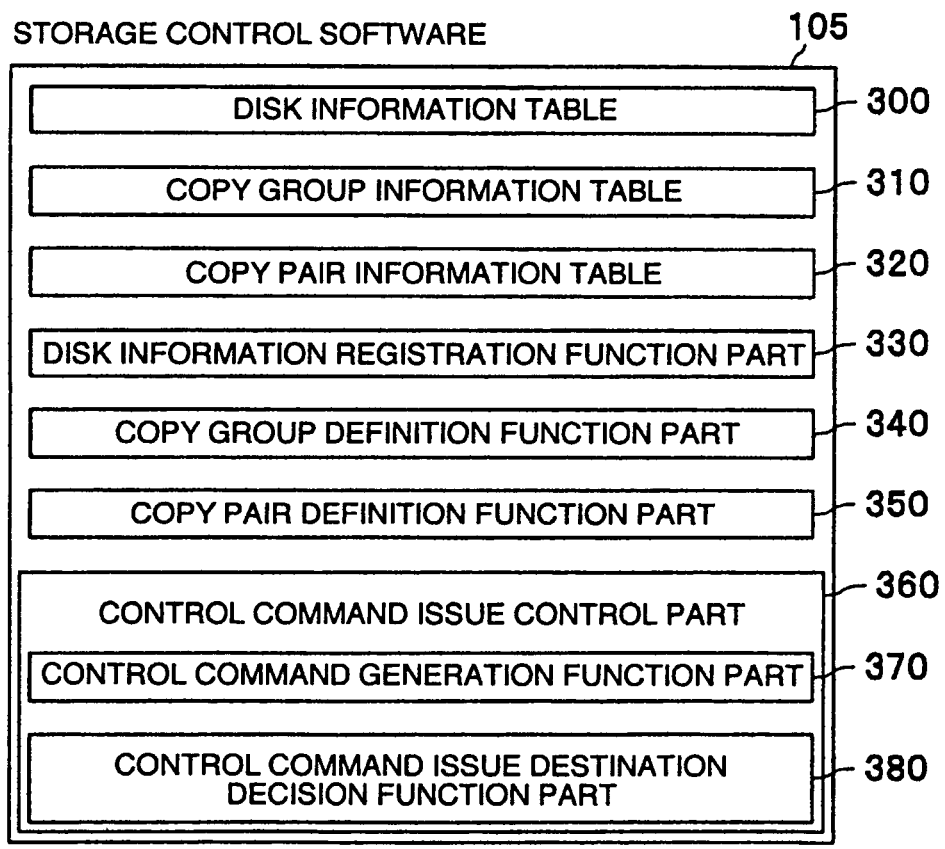

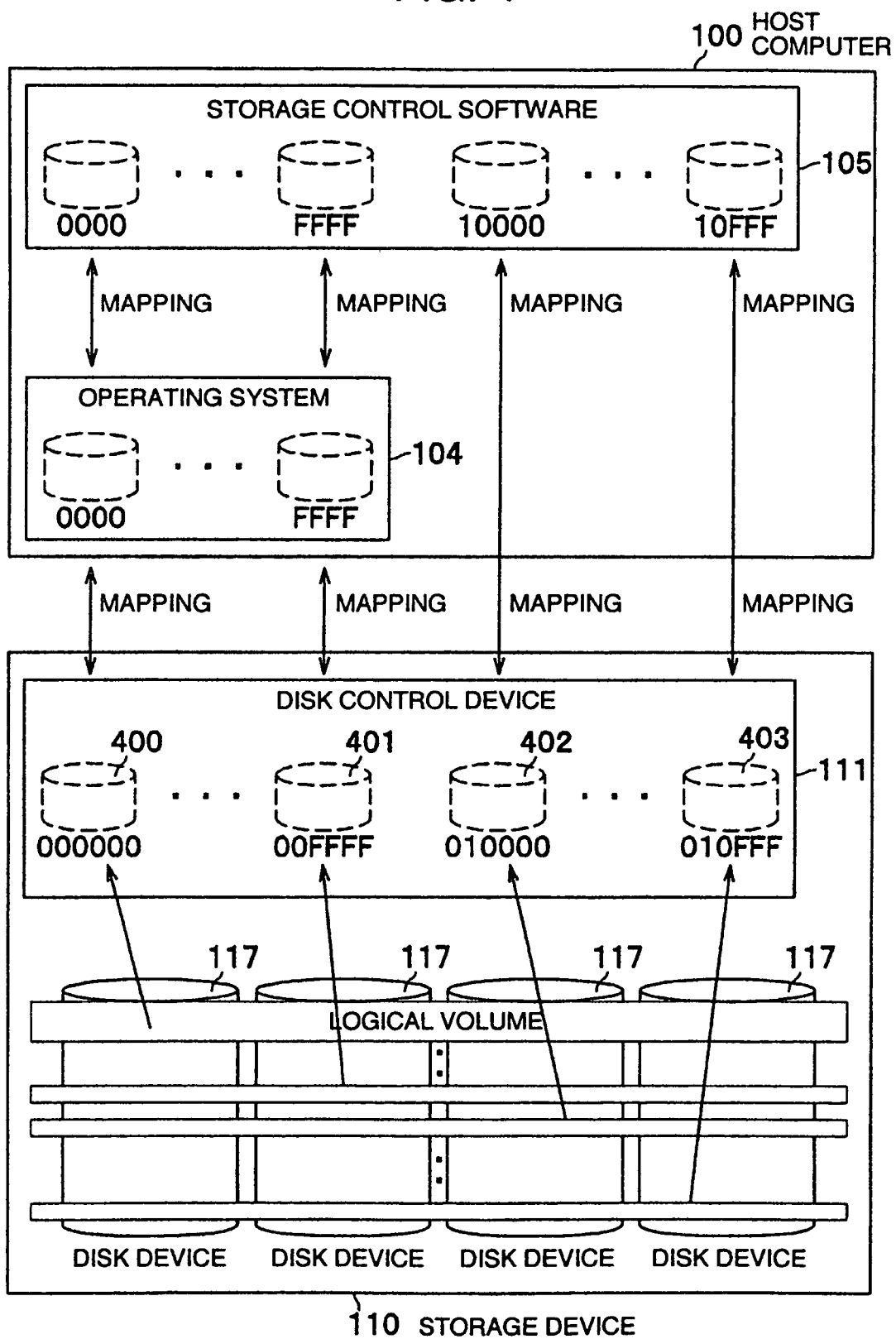

FIG. 5

CONTROL MEMORY 114

| CONTROL COMMAND EXECUTION CONTROL PART | — 500

FIG. 6

200 DEVICE INFORMATION TABLE

| DEVICE NUMBER (201) | STORAGE DEVICE MANUFACTURER'S SERIAL NUMBER (202) | LOGICAL VOLUME NUMBER (203) | |
|---|---|---|---|
| 1001 | SN001 | A001 | — 20A |
| 1002 | SN001 | A002 | — 20B |
| 1003 | SN001 | A003 | — 20C |
| 1004 | SN001 | A004 | — 20D |

FIG. 7

300 DISK INFORMATION TABLE

| DEVICE NUMBER | STORAGE DEVICE MANUFACTURER'S SERIAL NUMBER | LOGICAL VOLUME NUMBER | OS RECOGNITION FLAG | |
|---|---|---|---|---|
| 1001 | SN001 | A001 | Y | —30A |
| 1002 | SN001 | A002 | Y | —30B |
| 1003 | SN001 | A003 | Y | —30C |
| 1004 | SN001 | A004 | Y | —30D |
| 2001 | SN001 | B001 | Y | —30E |
| 7701 | SN001 | 7F01 | N | —30F |
| 7702 | SN001 | 7F02 | N | —30G |
| 7703 | SN001 | 7F03 | N | —30H |
| 7704 | SN001 | 7F04 | N | —30I |
| 7705 | SN001 | 7F05 | N | —30J |
| 7706 | SN001 | 7F06 | N | —30K |
| 7707 | SN001 | 7F07 | N | —30L |
| 7708 | SN001 | 7F08 | N | —30M |

FIG. 8

310 COPY GROUP INFORMATION TABLE

| COPY GROUP NUMBER | COPY STATE | COPY PAIR TABLE POINTER | |
|---|---|---|---|
| 0001 | UNDER COPY | ADDRESS 1 | ─31A |
| 0002 | UNFORMED | ADDRESS 2 | ─31B |
| 0003 | UNFORMED | ADDRESS 3 | ─31C |

320 COPY PAIR INFORMATION TABLE

| COPY PAIR NUMBER | PRIMARY DEVICE NUMBER | SECONDARY DEVICE NUMBER | PAIR STATE | |
|---|---|---|---|---|
| 0001 | 1001 | 1004 | UNDER COPY | ─32A |
| 0002 | 1002 | 7701 | UNDER COPY | ─32B |
| 0003 | 7702 | 1003 | UNDER COPY | ─32C |
| 0004 | 7703 | 7704 | UNDER COPY | ─32D |

321, 322, 323, 324

PROCESSING CONDUCTED BY COPY PAIR DEFINITION FUNCTION PART 350

STORAGE DEVICE CONTROL METHOD AND COMPUTER SYSTEM

INCORPORATION BY REFERENCE

The present application claims priority from Japanese application 2008-121160 filed on May 7, 2008, the content of which is hereby incorporated by reference into this application.

BACKGROUND OF THE INVENTION

The present invention relates to a storage device control method. In particular, the present invention relates to a storage device control method and a computer system used in copy processing in a backup system which requires a large amount of storage area in a large scale system.

Continuity of a business system becomes important. For preventing data loss or shortening the system recovery time at the time of fault occurrence, importance of data backup is increasing more and more. As one form of a backup system, there is a configuration in which data are copied between logical volumes in a storage device connected to a host computer.

A conventional backup system using a computer system includes a plurality of logical volumes recognized by the host computer. The host computer conducts data backup processing by issuing a control command such as copy start to a logical volume of operation object.

The term "recognized logical volume (recognized volume)" means a logical volume which is recognized by an operating system (OS) on the host computer and to which the host computer can issue a control command directly. To the contrary, the term "unrecognized volume" means a logical volume which is not recognized by the operating system and to which the host computer cannot issue a control command directly.

JP-A-2007-140601 (US-2007/113025A1 in English) describes operation of the logical volume to which the host computer cannot issue a control command directly. In the JP-A-2007-140601, means for operating a logical volume in a remote storage device in remote copy is disclosed.

SUMMARY OF THE INVENTION

As the amount of data handled by a business application increases, the storage capacity required for backup increases and the number of logical volumes operated by the host computer to conduct backup processing also increases.

The operating system which operates on the host computer needs resources for retaining information concerning a logical volume such as an identification number in order to recognize the logical volume. Because of an increase of logical volumes, the resources for recognition become insufficient and it is impossible in some cases to recognize all of logical volumes required for backup.

If it is attempted to form a backup system of only recognized volumes as in a conventional art in an environment in which resources for logical volume recognition become insufficient, then the capacity of the storage area becomes insufficient, disposition for dividing the unit of backup into a plurality of environments becomes necessary, and operation required to sustain the data consistency and conduct the copy operation becomes complicated. For operation in one backup system in order to keep the operation from becoming complicated, it is necessary to adopt a configuration in which a necessary storage area is secured by using unrecognized volumes in addition to recognized volumes. For using unrecognized volumes for the purpose of backup, however, it is necessary to make it possible to operate the unrecognized volumes from the host computer.

The present invention is an invention for solving the above-described problems. An object of the present invention is to provide a storage device control method which makes it possible for the host computer to conduct backup operation such as copy start on an unrecognized volume as well.

In order to achieve the object, an unrecognized volume is operated by transferring a control command issued from a host computer to a recognized volume to the unrecognized volume. First, storage control software which operates on the host computer selects a recognized volume of control command issue destination on the basis of definition relating to copy operation. The control command has a field for specifying a logical volume of transfer destination. At this time, an unrecognized volume of operation object is set in the field. A disk control device in a storage device has a function of referring to the field in the control command and transferring the control command to the specified logical volume. The control command issued from the host computer to the storage device is transferred to the unrecognized volume of operation object. As a result, desired operation can be conducted.

According to the present embodiment, it is possible for the host computer to conduct backup operation such as copy start on an unrecognized volume as well.

Other objects, features and advantages of the invention will become apparent from the following descriptions of the embodiments of the invention taken in conjunction with the accompanying drawings.

BRIEF DESCRIPTION OF THE DRAWINGS

FIG. 1 is a diagram showing a general configuration of a computer system according to an embodiment;

FIG. 2 is a diagram showing an operating system which operates on the host computer;

FIG. 3 is a diagram showing storage control software which operates on the host computer;

FIG. 4 is a diagram showing management of logical volumes;

FIG. 5 is a diagram showing a control memory in a disk control device;

FIG. 6 is a diagram showing a device information table;

FIG. 7 is a diagram showing a disk information table;

FIG. 8 is a diagram showing a copy group information table;

FIG. 9 is a diagram showing a copy pair information table;

DESCRIPTION OF THE EMBODIMENTS

Figure 10:
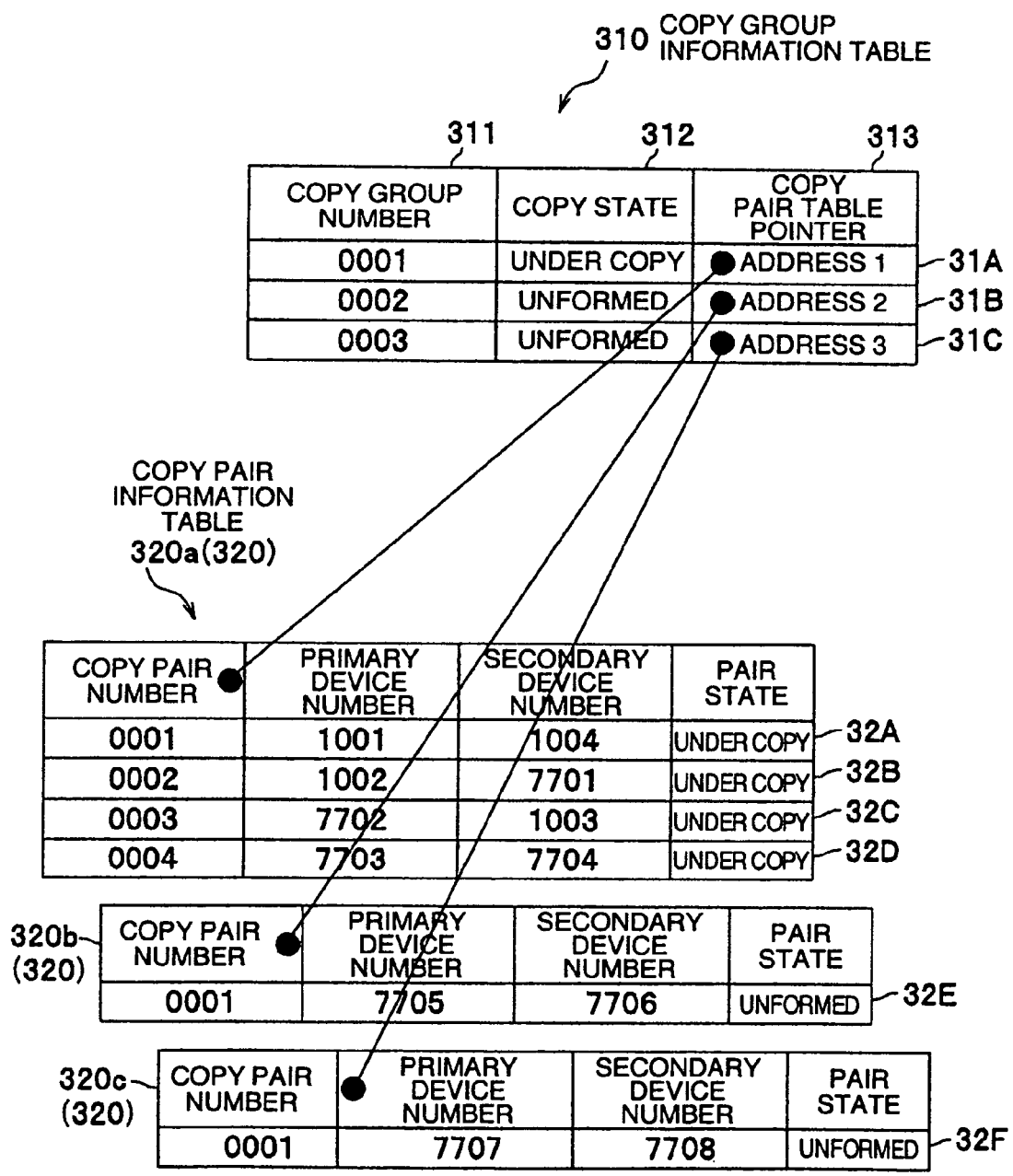
FIG. 10 is a diagram showing relations between the copy group information table and the copy pair information table.

Hereafter, an embodiment of the present invention will be described in detail with reference to the drawings. However, the present invention is not limited to the embodiment hereafter described.
(System Configuration)

A configuration of a computer system according to the present embodiment will now be described with reference to FIGS. 1 to 5.

FIG. 1 is a diagram showing a general configuration of a computer system according to the present embodiment. The computer system includes a host computer 100, a storage device 110 and a terminal 120. As for the storage device 110, there is one storage device 110 in some cases and there are a plurality of storage devices 110 in other cases.

The terminal 120 is, for example, a PC (Personal Computer). The terminal 120 is provided to input an order such as backup operation and display a result of backup operation. The terminal 120 is not restrictive as long as alternative means for the operation order (for example, such as an application program which inputs a backup operation order) is included.

In the present embodiment, an example in which an operation order is input from the terminal 120 will be described. In the description of the present embodiment, a device obtained by connecting a disk control device and a disk device to each other is referred to as "storage device."

The host computer 100 is connected to the storage device 110 via a communication line (for example, an FC (Fibre Channel) network). The host computer 100 is connected to the terminal 120 via a communication line (for example, a LAN (Local Area Network) or a WAN (Wide Area Network)).

In the ensuing description of the present embodiment, software relating to processing required for the host computer 100 to issue a control command to a logical volume in the storage device 110 to order operation such as copy start for data backup, and a hardware configuration for executing the software will be described.

The host computer 100 includes a processor 101, an IO (Input/Output) port 102, and a memory 103. Although not illustrated, the processor 101, the IO port 102, and the memory 103 are connected to each other via a communication line such as an internal bus. An operating system 104 and storage control software 105 are stored in the memory 103, and operated on the host computer 100 by the processor 101. The operating system 104 is a program for managing resources of the host computer 100, and the operating system 104 will now be described with reference to FIG. 2.

FIG. 2 is a diagram showing the operating system which operates on the host computer. The operating system 104 includes a device information table 200 (see FIG. 6) and an IO issue control part 210 (see FIG. 28). The device information table 200 retains information of the storage device controlled by the operating system 104. Details of the device information table 200 will be described later with reference to FIG. 6. The IO issue control part 210 controls an IO issued to the storage device 110 via the IO port 102 and the communication line. A control command 1500 (see FIG. 15) issued to operate a logical volume in the storage device 110 (see FIG. 1) is delivered via an IO sent from the operating system 104. Herein, the term "IO" means request and data transmitted and received between the host computer and the storage device, or means request and data concerning writing into a storage area or reading from a storage area.

Referring back to FIG. 1, the storage control software 105 is a program for controlling a logical volume in the storage device in order to backup data. The storage control software 105 will now be described with reference to FIG. 3.

FIG. 3 is a diagram showing storage control software which operates on the host computer. The storage control software 105 includes a disk information table 300, a copy group information table 310, a copy pair information table 320, a disk information registration function part 330, a copy group definition function part 340, a copy pair definition function part 350, and a control command issue control part 360. The control command issue control part 360 includes a control command generation function part 370 and a control command issue destination decision function part 380.

It is supposed that a business application is on the side of writing business data. A logical volume which retains original data to be backed up and a logical volume of backup destination are paired and referred to as "copy pair." The logical volume which retains the original data to be backed up is referred to as "primary logical volume" and the logical volume of backup destination is referred to as "secondary logical volume." In addition, a collection of a plurality of copy pairs is referred to as "copy group." The copy group is the unit of operation. A copy order can be specified with a copy group taken as the unit by collecting a plurality of copy pairs to be backed up. A storage administrator can issue a copy order to a plurality of copy pairs collectively by specifying a copy group number.

Figure 15:
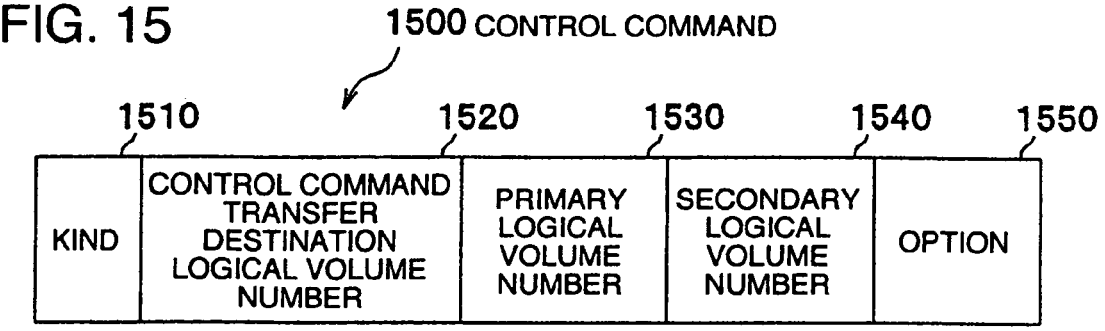
FIG. 15 is a diagram showing a format of a control command.

The storage control software 105 orders a logical volume to conduct operation such as copy pair formation, copy pair state suspension (temporary stop), recovery from copy pair state suspension, copy pair state deletion, and copy pair state acquisition by using the control command 1500 (see FIG. 15).

The control command issue control part 360 has a function of generating and issuing the control command 1500. The control command 1500 issued to a logical volume by the control command issue control part 360 is delivered to the storage device 110 via an IO issued by the operating system 104.

The control command generation function part 370 has a function of generating the control command 1500 from input information. The control command issue destination decision function part 380 has a function of judging a logical volume to which the control command is issued, on the basis of whether a logical volume to be operated is a recognized volume or an unrecognized volume.

The disk information table 300 is a table for storing information of logical volumes retained by the storage control software 105. Details of the disk information table 300 will be described later with reference to FIG. 7. The disk information registration function part 330 has a function of setting and registering information of logical volumes in the disk information table 300.

The copy group information table 310 is a table for storing information concerning copy groups retained by the storage control software 105. Details of the copy group information table 310 will be described later with reference to FIG. 8. The copy group definition function part 340 has a function of setting definition information of copy groups in the copy group information table 310.

The copy pair information table 320 is a table for storing information concerning copy pairs retained by the storage control software 105. Details of the copy pair information table 320 will be described later with reference to FIG. 9. The copy pair definition function part 350 has a function of setting definition information of copy pairs in the copy pair information table 320.

Referring back to FIG. 1, the storage control software 105 transmits information of the disk information table 300, the copy group information table 310 and the copy pair information table 320 to the terminal 120, and causes a display unit to display the information.

The storage device 110 includes a disk control device 111 and disk devices 117. The disk control device 111 is connected to the disk devices 117 via a communication line.

The disk control device 111 includes a port 112, a processor 113, a control memory 114, a cache memory 115 and a port 116. Although not illustrated, the port 112, the processor 113, the control memory 114, the cache memory 115 and the port 116 are connected to each other via a communication line such as an internal bus. The disk control device 111 is a device which controls a disk array formed of the disk devices 117. An IO sent from the host computer 100 via the port 112 is made to act on a logical volume under control via the port 116.

IOs transmitted to the storage device 110 by the host computer 100 are classified broadly into control information and actual data. A control command for ordering backup operation is transmitted to the storage device 110 as an IO of control information, and data to be handled by a business application or the like is transmitted to the storage device 110 as an IO of actual data.

The cache memory 115 is a memory for temporarily storing an IO of actual data. Owing to use of the cache memory 115, the storage device 110 can respond by transmitting a write completion message to the host computer 100 before actually writing the actual data into the disk device 117.

The control memory 114 is a memory for temporarily storing control information. A control command transmitted from the host computer 100 is first written into the control memory 114. The control memory 114 will now be described with reference to FIG. 5.

FIG. 5 is a diagram showing the control memory in the disk control device. The control memory 114 includes a control command execution control part 500. The control command execution control part 500 is operated by the processor 113 to judge an operation object logical volume of a control command written into the control memory 114, transmit the control command to the object logical volume, and execute the control command.

Referring back to FIG. 1, the disk device 117 is a storage area for storing data handled by the host computer 100. As for the disk device 117, there is one disk device 117 in some cases and there are a plurality of disk devices 117 in other cases. In the configuration of the present embodiment, a HDD (Hard Disk Drive) is adopted as the "disk." However, the present invention is not limited to this, but a nonvolatile memory (flash memory) formed of semiconductor, an optical storage medium (optical disk), magnetic tape or a mixture of them may be used. In the present embodiment, an HDD is used as the disk.

The disk devices 117 are handled divisionally or in a combinational manner as a logical storage area (logical volume) by the disk control device 111. "Logical volume" is defined as the whole or a partial storage area of one disk device or a set of individual storage areas of a plurality of disk devices.

FIG. 4 is a diagram showing management of logical volumes. FIG. 4 shows a range of logical volumes controlled by the disk control device 111, and the operating system 104 and the storage control software 105 in the host computer 100. The disk control device 111 logically divides the disk array formed of the disk devices 117, and controls respective areas as logical volumes so as to make it possible for the host computer 100 to use them.

The disk control device 111 assigns logical volume numbers to all logical volumes. In an example shown in FIG. 4, the logical volume number has a form of a six-digit hexadecimal number. Numbers beginning with "000000" in a logical volume 400 and ending with "010FFF" in a logical volume "010FFF" are assigned. By the way, the logical volume number is not restricted to numerical values of six-digit hexadecimal numbers.

On the other hand, the operating system 104 on the host computer 100 assigns device numbers to logical volumes in the storage device 110. The operating system 104 manages the logical volumes by mapping device numbers and logical volume numbers of respective storage devices. In the example shown in FIG. 4, the operating system 104 assigns a device number of a four-digit hexadecimal number such as "0000" to the logical volume 400 and "FFFF" to the logical volume 401. Information of the mapping is managed by using the device information table 200 (see FIG. 6) in the operating system 104. A device number 201 in the device information table 200 is associated with a storage device manufacturer's serial number 202 and a logical volume number 203 to identify a logical volume. The device information table 200 will be described later with reference to FIG. 6.

If the number which can be represented by the device number is less than the number of logical volumes in the storage device as in the example shown in FIG. 4, then logical volumes which can not be assigned a device number exist in the storage device. In the example shown in FIG. 4, the operating system 104 cannot assign a device number to a logical volume 402 and a logical volume 403. Therefore, the logical volume 402 and the logical volume 403 become unrecognized volumes which cannot be managed by the operating system 104. When conducting backup of a logical volume group including unrecognized volumes in an environment as shown in FIG. 4, it is necessary to control the unrecognized volumes from the host computer 100.

The storage control software 105 on the host computer 100 manages information of the unrecognized volumes as well besides logical volumes assigned device numbers by the operating system 104. In the example shown in FIG. 4, a device number beginning with "0000" for the logical volume 400 and ending with "10FFF" for the logical volume 403 is assigned. By the way, the device numbers assigned by the storage control software 105 need not be the same in form as the device numbers assigned by the operating system 104. Furthermore, it is not necessary to assign the device numbers to all logical volume in the storage device 110. For example, the device numbers may be assigned only to logical volumes used for backup. The storage control software 105 manages information of the logical volumes by using the disk information table 300 (see FIG. 7). A device number 301 in the disk information table 300 is associated with a storage device manufacturer's serial number 302 and a logical volume number 303 to identify a logical volume. The disk information table 300 will be described later with reference to FIG. 7.

FIG. 6 is a diagram showing the device information table. The device information table 200 retained by the operating system 104 includes the device number 201, the storage device manufacturer's serial number 202, and the logical volume number 203. The device number 201 is a number assigned arbitrarily to a logical volume under control of the operating system 104 thereby. The storage device manufacturer's serial number 202 is a unique number for identifying the storage device 110. The logical volume number 203 is a number assigned by the disk control device 111 to identify the logical volume.

FIG. 7 is a diagram showing the disk information table. The disk information table 300 retained by the storage control software 105 is a table for storing information of the logical volumes. As shown in FIG. 7, the disk information table 300 includes the device number 301, the storage device manufacturer's serial number 302, the logical volume number 303, and an OS recognition flag 304.

The device number 301 is a number assigned arbitrarily to a logical volume under control of the operating system 104 thereby. The storage device manufacturer's serial number 302 is a unique number to identify the storage device 110. The logical volume number 303 is a number assigned by the disk control device 111 to identify the logical volume.

The device number 301, the storage device manufacturer's serial number 302, and the logical volume number 303 in the disk information table 300 correspond to respective values in the device information table 200 retained by the operating system 104 and shown in FIG. 6. However, corresponding records exist for only logical volumes recognized by the operating system 104. Records corresponding to unrecognized volumes do not exist in the device information table 200.

Information indicating whether there is a correspondence relation between FIG. 6 and FIG. 7 is the OS recognition flag 304 in the disk information table 300. The OS recognition flag 304 represents whether the logical volume is a logical volume recognized by the operating system 104. For a recognized volume, "Y" is set. For an unrecognized volume, "N" is set. For example, as for a record 30A having a device number "1001" in the disk information table 300 shown in FIG. 7, a record 20A having a device number "1001" in the device information table 200 shown in FIG. 6 corresponds thereto, and "Y" is set in the OS recognition flag 304. As for a record 30F having a device number "7701" in the disk information table 300, a corresponding record does not exist in the device information table 200 and consequently the OS recognition flag is set to "N."

The device number "7701" is a device number assigned to an unrecognized volume, and it does not exist in the device information table 200. Since the operating system 104 does not assign device numbers to unrecognized volumes, the user or the storage control software 105 assigns device numbers. By the way, the device numbers assigned to the unrecognized volumes may not conform to the form of the device numbers assigned by the operating system 104. For example, it is conceivable to assign a number which facilitates discrimination between a recognized volume and an unrecognized volume in operation.

FIG. 8 is a diagram showing a copy group information table. A copy group managed in the copy group information table 310 retained by the storage control software 105 is obtained by collectively defining a plurality of copy pairs to be backed up in a lump. The storage administrator can also conduct copy processing by taking a copy pair as the unit. Alternatively, however, the storage administrator can operate copy processing with a copy pair taken as the unit by specifying a copy group. In the copy processing with a copy group specified, a control command with a copy pair taken as the unit is generated by the storage control software and a control command is issued to the storage device with a copy pair taken as the unit.

The copy group information table 310 is a table for storing definition of the copy group. As shown in FIG. 8, the copy group information table 310 includes a copy group number 311, a copy state 312, and a copy pair table pointer 313. The copy group number 311 is an identifier arbitrarily assigned to the copy group, and the copy group number 311 is specified when operating the copy group. The copy state 312 indicates a copy state of a copy group obtained by collecting a plurality of copy pairs. As for kinds of the state, they will be described in description of the copy pair later. The copy pair table pointer 313 is an address of a copy pair table which retains a list of copy pairs belonging to the copy group.

FIG. 9 is a table showing the copy pair information table. The copy pair information table 320 retained by the storage control software 105 is a table for storing copy pair definition. As shown in FIG. 9, the copy pair information table 320 includes a copy pair number 321, a primary device number 322, a secondary device number 323, and a pair state 324. The copy pair number 321 is an identifier arbitrarily assigned to the copy pair, and the copy pair number 321 is specified when operating the copy pair. The primary device number 322 specifies a primary logical volume. In the same way, the secondary device number 323 specifies a secondary logical volume. The pair state 324 indicates a state of the copy pair, and "unformed" is set as its initial state. The copy state of a copy group indicates a state of the whole of copy pairs belonging to the copy group. As the copy state, there are "unformed" indicating that a copy pair is not yet formed, "under copy" indicating that copy is being conducted in a duplicated state with the primary logical volume and the secondary logical volume, and "temporary stop" indicating a temporary interrupt state of copy.

There are four copy pairs in the copy pair information table 320 shown in FIG. 9. For example, a record 32A having "0001" in the copy pair number 321 indicates that a primary logical volume having a device number "1001" and a secondary logical volume having a device number "1004" constitute a copy pair and its state is "under copy."

FIG. 10 is a diagram showing relations between the copy group information table and the copy pair information table. Addresses in the copy pair information table 320 are set in the copy pair table pointer 313 in the copy group information table 310. For example, the copy pair table pointer 313 of a record 31A in the copy group information table 310 indicates an address of a copy pair information table 320a (320). In the same way, the copy pair table pointers 313 of a record 31B and a record 31C indicate addresses of a copy pair information table 320b (320) and a copy pair information table 320c (320), respectively. In this way, one copy pair information table 320 corresponds to each record in the copy group information table 310, and stores a list of copy pairs belonging to the copy group.

Figure 11:
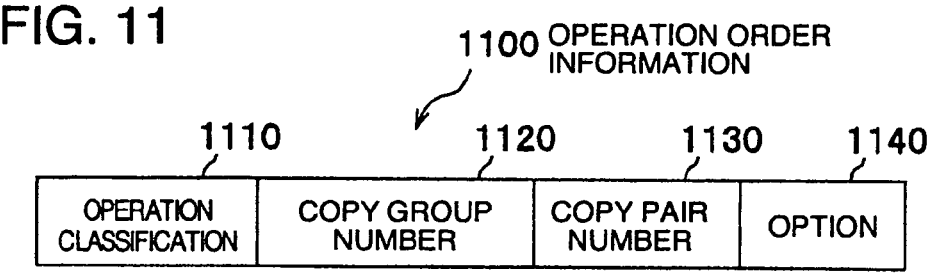
FIG. 11 is a diagram showing a format of operation order information.

FIG. 11 is a diagram showing a format of operation order information. Operation order information 1100 is operation order information for copy pair operation which is input to the storage control software 105. The operation order information 1100 includes an operation classification 1110, a copy group number 1120, a copy pair number 1130, and an option 1140. For example, when conducting operation on the record 32A having "0001" in the copy pair number and "under copy" in the pair state in the copy pair information table 320 (see FIG. 9), "0001" is specified in the copy group number 1120, "0004" is specified in the copy pair number 1130, and a number corresponding to temporary copy stop is set in the operation classification 1110. Information according to the copy classification is input to the option 1140. For example, in the case of temporary copy stop, it is conceivable to attempt copy synchronization and then conduct temporary stop.

Figure 12:
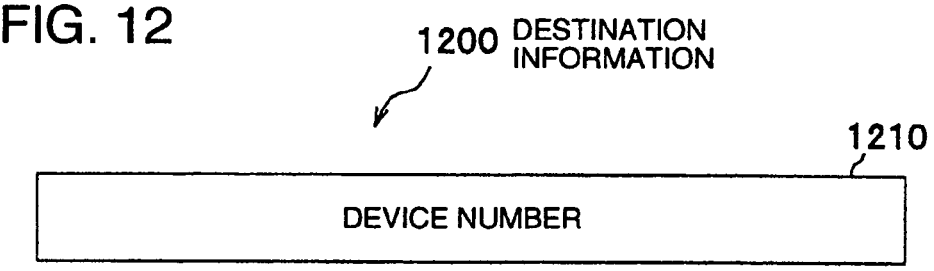
FIG. 12 is a diagram showing a format of destination information.

FIG. 12 is a diagram showing a format of destination information. Destination information 1200 includes a device number 1210 of a logical volume of control command issue destination used when the storage control software 105 requests the operating system 104 to issue an IO. The destination information will be described later with reference to FIG. 16.

Figure 13:
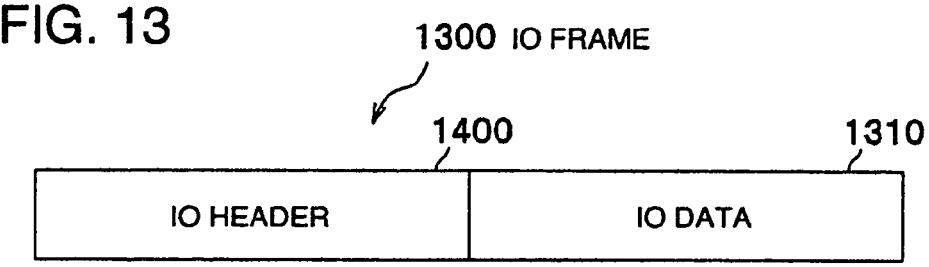
FIG. 13 is a diagram showing a format of an IO frame.

FIG. 13 is a diagram showing a format of an IO frame. The operating system 104 generates an IO frame 1300 to a logical volume in the storage device 110. Its processing flow will be described later with reference to FIG. 16. The IO frame 1300 includes an IO header 1400 and IO data 1310. The IO header 1400 specifies a logical volume of IO issue destination. The IO data 1310 is a part for storing data delivered by the IO frame. The control command 1500 (see FIG. 15) received from the storage control software 105 is set in the IO data 1310.

Figure 14:
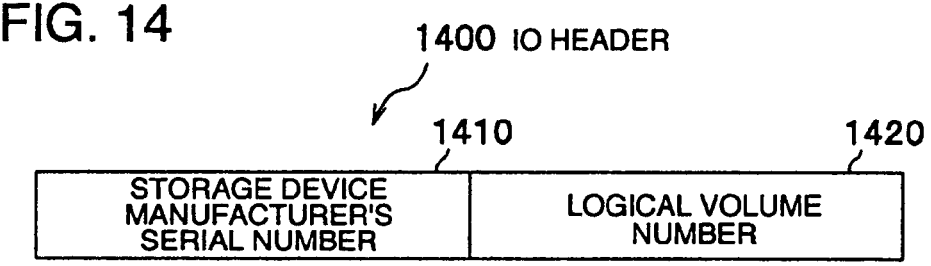
FIG. 14 is a diagram showing a format of an IO header.

FIG. 14 is a diagram showing a format of the IO header. The IO header 1400 shown in FIG. 13 includes a storage device manufacturer's serial number 1410 and a logical volume number 1420.

FIG. 15 is a diagram showing a format of a control command. The control command 1500 is a control command for operating a logical volume. The control command 1500 generated by the control command generation function part 370 includes a kind 1510, a control command transfer destination logical volume number 1520, a primary logical volume number 1530, a secondary logical volume number 1540, and an option 1550. The kind 1510 indicates a classification of copy processing operation. The control command transfer destination logical volume number 1520 is information for ordering the disk control device 111 to transfer the control command to a logical volume of operation object when the logical volume of operation object is different from a logical volume of control command issue destination. The primary logical volume number 1530 indicates a logical volume number of primary side in the copy pair of operation object, whereas the secondary logical volume number 1540 indicates a logical volume number of secondary side in the copy pair of operation object. The option 1550 is additional information prepared for each operation classification.

A procedure for generating the disk information table 300 will now be described.

(1. Procedure for Generating Disk Information Table 300)

Figure 23:
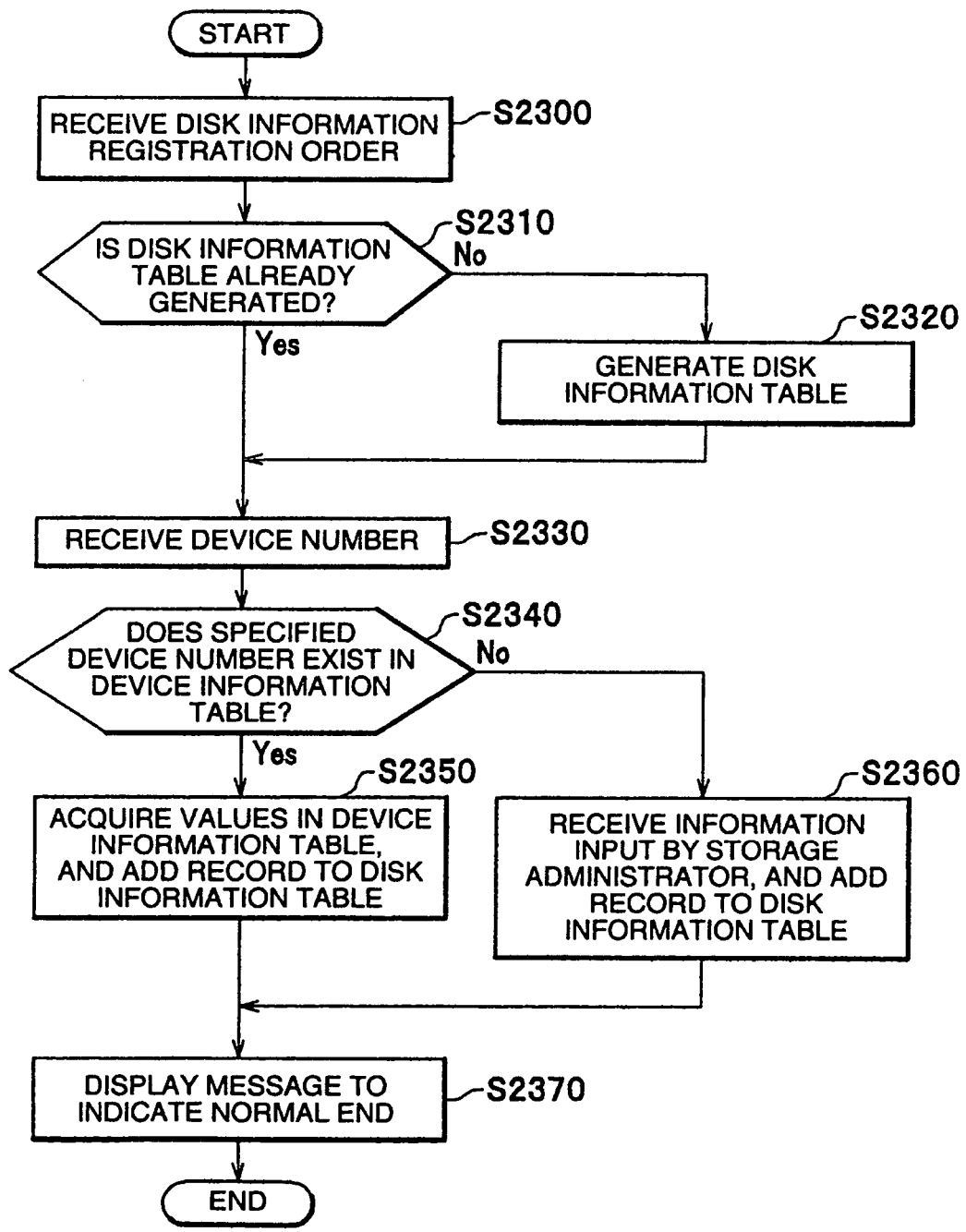
FIG. 23 is a flow chart showing processing conducted by a disk information registration function part.

FIG. 23 is a flow chart showing processing conducted by the disk information registration function part. The flow chart will be described with reference to FIGS. 6 and 7 as occasion demands. As shown in FIG. 23, the disk information registration function part 330 in the storage control software 105 conducts processing of registering disk information into the disk information table 300 retained by the storage control software 105.

First, the administrator of the storage device 110 (hereafter referred to as storage administrator) orders data backup operation by using the storage control software 105 and the terminal 120. Thereupon, the terminal 120 issues a disk information registration order to the host computer 100. Information input from the terminal 120 is delivered as input to the storage control software 105 operating on the host computer 100. In the ensuing description of the present specification, information input from the terminal 120 is delivered to the storage control software 105 operating on the host computer 100, although not expressed clearly each time.

Upon receiving the disk information registration order (step S2300), the disk information registration function part 330 confirms whether the disk information table 300 is already generated (step S2310). If it is found as a result of the confirmation that the disk information table 300 is not generated (no at the step S2310), then the disk information registration function part 330 generates the disk information table 300 (step S2320) and proceeds to step S2330. If it is found that the disk information table 300 is already generated (yes at the step S2310), then the disk information registration function part 330 proceeds to the step S2330.

At the step S2330, the storage control software 105 receives a device number of a logical volume to be registered in the disk information table 300 specified by the storage administrator via the terminal 120. The storage control software 105 confirms whether a record having a device number which coincides with the device number received from the terminal 120 at the step S2330 exists in the device information table 200 retained by the operating system 104 (step S2340).

If a record having a coincident device number is found (yes at the step S2340) as a result of the confirmation at the step S2340, then the storage control software 105 adds a record to the disk information table 300, and sets values of a coincident record stored in the device information table 200 (step S2350). At this time, the storage control software 105 sets "Y" in a value of the OS recognition flag. In other words, it is indicated that the operating system 104 recognizes the record. And the storage control software 105 proceeds to step S2370.

On the other hand, if a record having a coincident device number is not found as a result of the confirmation at the step S2340 (no at the step S2340), then the storage control software 105 receives a device number, a storage device manufacturer's serial number, and a logical volume number input by the storage administrator, adds a record to the disk information table 300, and sets the input values (step S2360). In this case, the storage control software 105 sets "N" in the OS recognition flag 304 to indicate that the operating system 104 does not recognize it. And the storage control software 105 proceeds to step S2370. Upon adding a record to the disk information table at the step S2350 or the step S2360, the storage control software 105 displays a message on the terminal 120 to indicate the normal end (step S2370), and finishes the processing.

A procedure used by the copy group definition function part 340 to set the copy group information table 310 will now be described with reference to FIG. 24.

(2. Copy Group Definition Procedure and Copy Pair Definition Procedure)
(2.1 Copy Group Definition Procedure)

Figure 24:
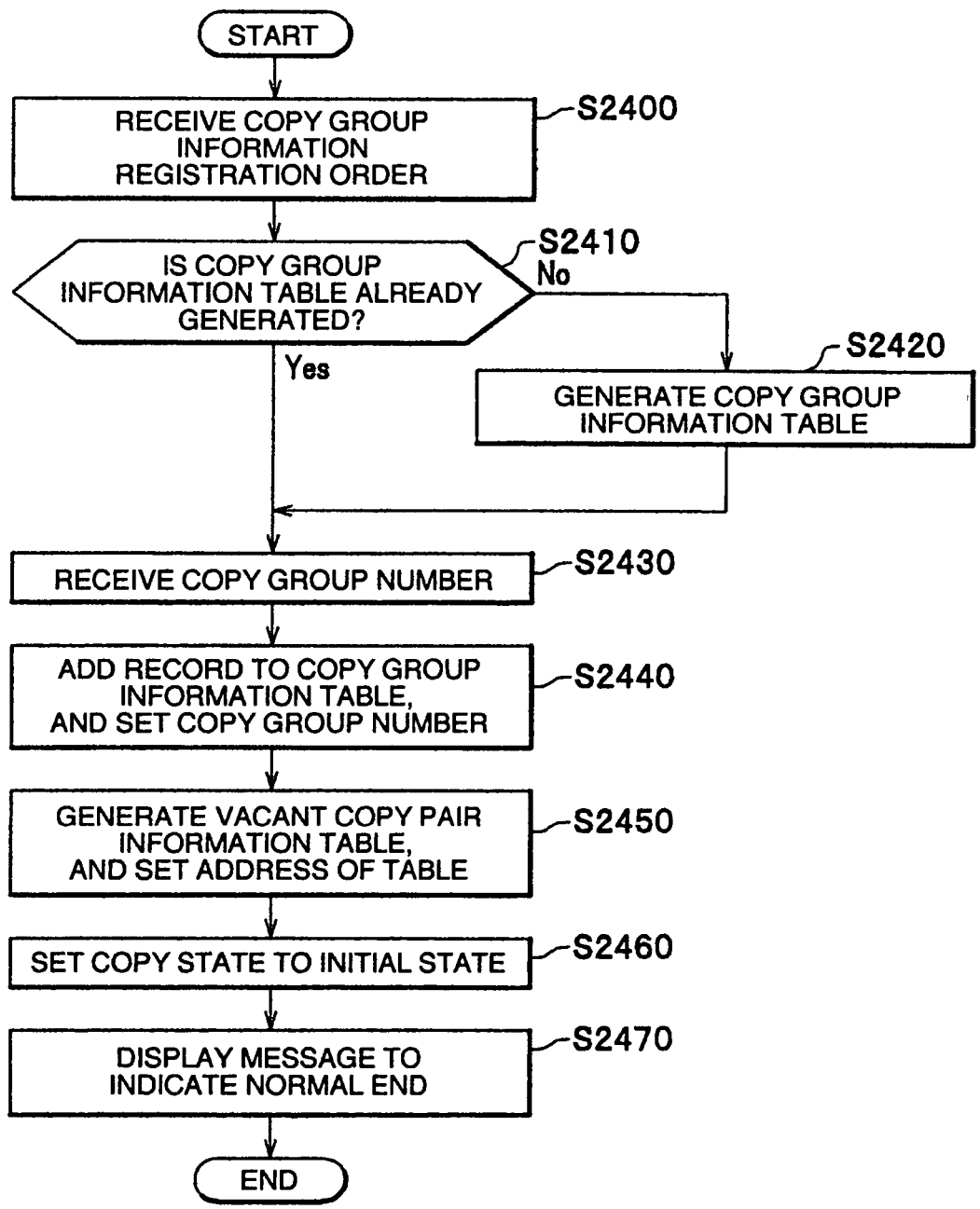
FIG. 24 is a flow chart showing processing conducted by a copy group definition function part.

FIG. 24 is a flow chart showing processing conducted by the copy group definition function part. The flow chart will be described with reference to FIG. 8 as occasion demands. As shown in FIG. 24, the copy group definition function part 340 in the storage control software 105 conducts processing of setting copy group definition in the copy group information table 310 retained by the storage control software 105.

First, the copy group definition function part 340 receives a copy group information registration order from the terminal 120 on the basis of an order of the storage administrator (step S2400). The copy group definition function part 340 confirms whether the copy group information table 310 is already generated (step S2410). If it is found as a result of the confirmation that the copy group information table 310 is not generated (no at the step S2410), then the copy group definition function part 340 generates the copy group information table (step S2420) and proceeds to step S2430. If it is found that the copy group information table 310 is already generated (yes at the step S2410), then the copy group definition function part 340 proceeds to the step S2430. And the copy group information table 310 receives the copy group number input by the storage administrator from the terminal 120 (step S2430).

The copy group definition function part 340 adds a record to the copy group information table 310, and sets the copy group number 311 (step S2440). Furthermore, the copy group definition function part 340 generates a vacant copy pair information table 320 (see FIG. 9) for storing copy pairs which belong to the copy group, sets an address of the table in the copy pair table pointer 313 (step S2450), and sets the copy state 312 to the initial state (step S2460). Upon adding a record to the copy group information table 310, the copy group definition function part 340 displays a message on the terminal 120 to indicate the normal end (step S2470), and finishes the processing.

A procedure used by the copy pair definition function part 350 to set the copy pair information table 320 will now be described with reference to FIG. 25.

(2.2 Copy Pair Definition Procedure)

Figure 25:
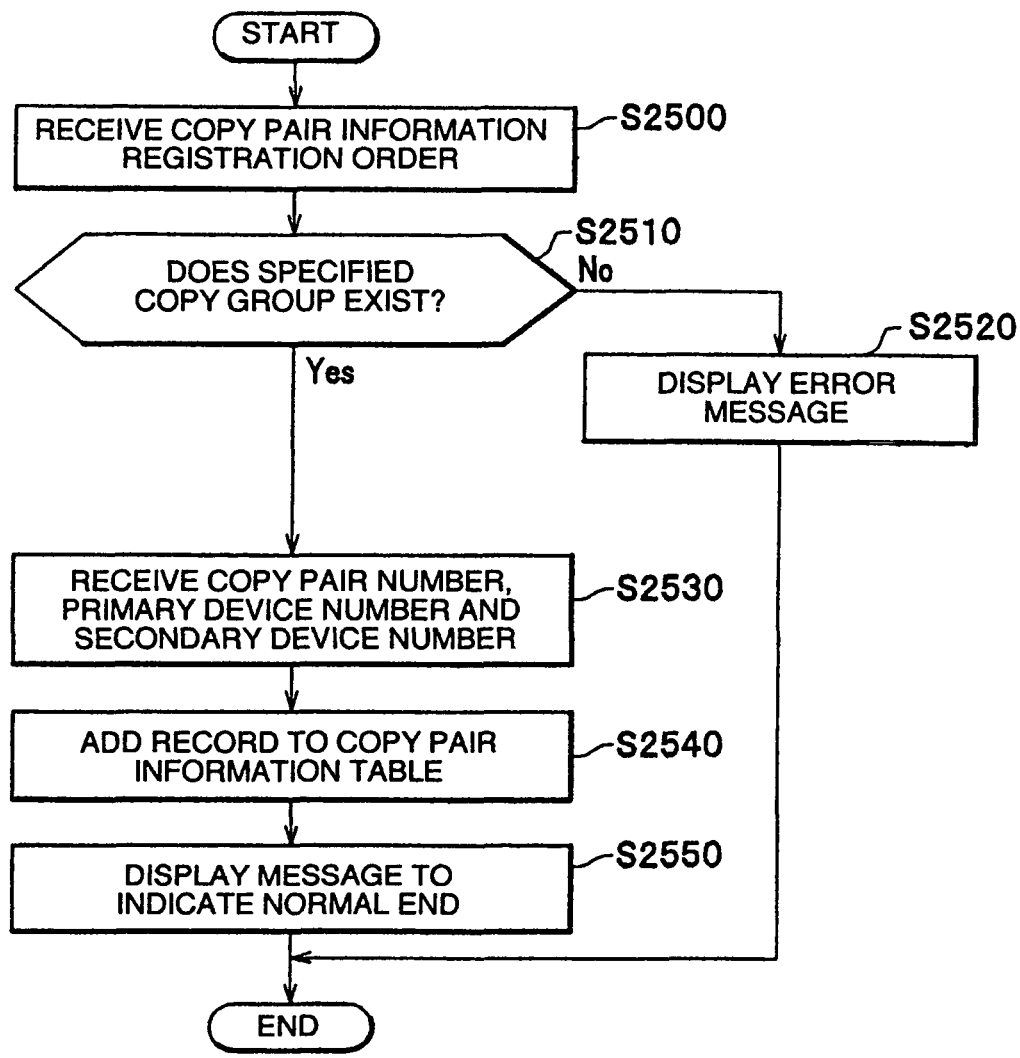
FIG. 25 is a flow chart showing processing conducted by a copy pair definition function part.

FIG. 25 is a flow chart showing processing conducted by the copy pair definition function part. The flow chart will be described with reference to FIG. 9 as occasion demands. As shown in FIG. 25, the copy pair definition function part 350 in the storage control software 105 conducts processing of setting copy pair definition in the copy pair information table 320.

First, the copy pair definition function part 350 receives a copy pair information registration order from the terminal 120 on the basis of an order of the storage administrator (step S2500). In a copy pair definition generation order, a copy group to which copy pair definition is to be added is specified. The copy pair definition function part 350 confirms whether the specified copy group exists (step S2510). This confirmation is conducted by comparing the copy group number of the specified copy group with the copy group number 311 in the copy group information table 310. If it is found as a result of the confirmation that the specified copy group does not exist (no at the step S2510), then the copy pair definition function part 350 displays an error message on the terminal 120 (step S2520) and finishes the processing.

If the specified copy group exists (yes at the step S2510), then the copy pair definition function part 350 receives a copy pair number, a primary device number and a secondary device number input by the storage administrator from the terminal 120 (step S2530). And the copy pair definition function part 350 adds a record to the copy pair information table 320, and sets the input values (the copy pair number, the primary device number and the secondary device number) (step S2540). The copy pair definition function part 350 sets "unformed" in the pair state 324 as the initial state. Upon adding a record to the copy pair information table 320, the copy pair definition function part 350 displays a message on the terminal 120 to indicate the normal end (step S2550), and finishes the processing.

(3. Processing Procedure Concerning Issue of Control Command to Logical Volume)
(3.1 Outline Ranging from Control Command Generation to Execution)

First, an outline ranging from generation to execution of a control command for ordering a logical volume to conduct backup operation will now be described with reference to FIG. 16. Details of each processing will be described later.

Figure 16:
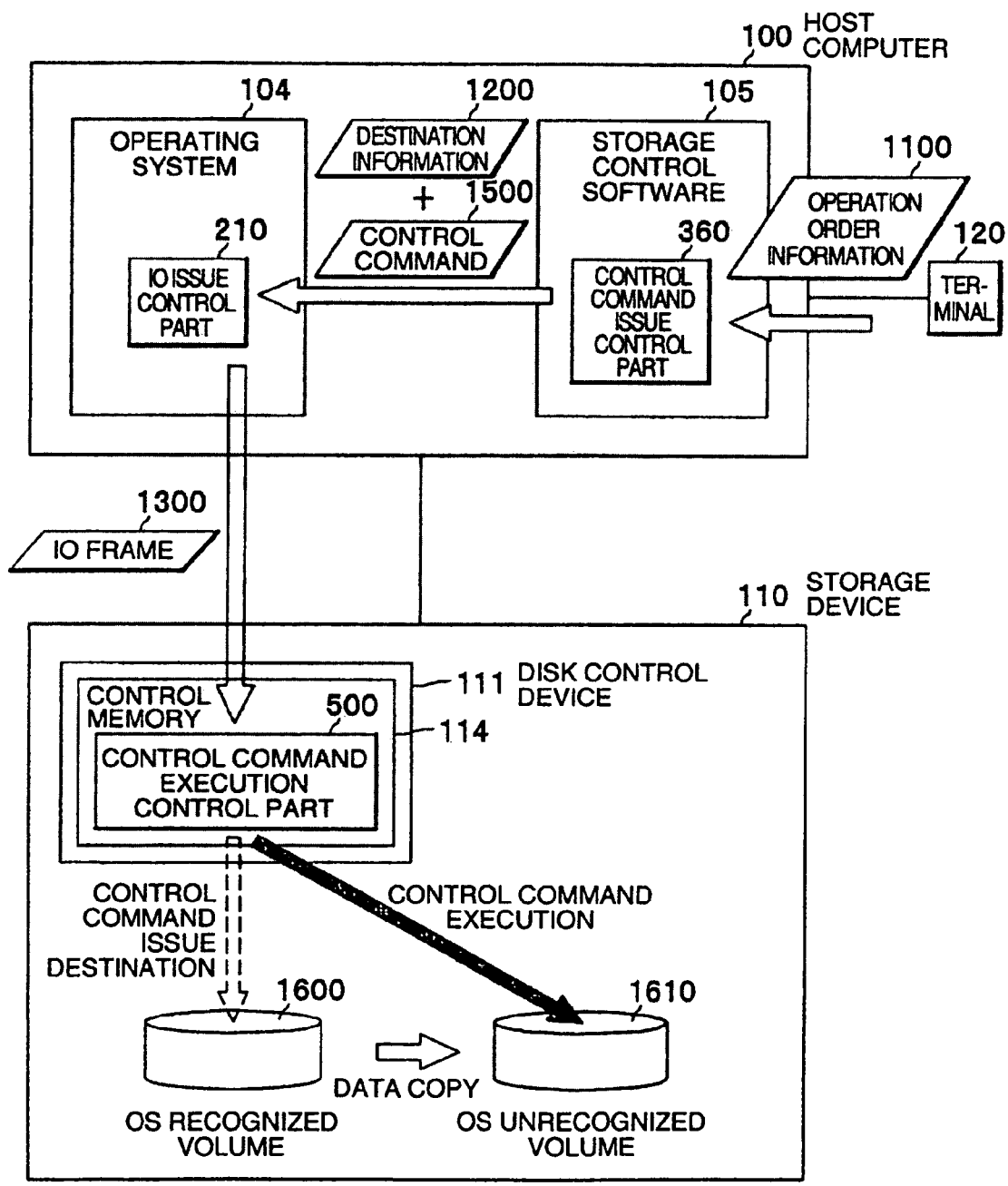
FIG. 16 is a diagram showing an outline ranging from a copy pair operation order to control command execution.

FIG. 16 is a diagram showing an outline ranging from the copy pair operation order to the control command execution. Only elements required to indicate the outline ranging to control command execution are shown in FIG. 16. However, the computer system has the configuration shown in FIG. 1. First, the storage administrator inputs the operation order information 1100 to the terminal 120 to conduct copy pair operation. Giving the operation order information to the storage control software 105 is not restrained to the form in which the storage administrator inputs the operation order information by using the terminal 120. For example, an application program operating on the host computer 100 may be used.

The storage control software 105 delivers the operation order information received from the terminal 120 to the control command issue control part 360. The control command issue control part 360 confirms whether a control command can be issued to a logical volume of operation object, judges a control command issue destination, and generates a control command 1500. And the control command issue control part 360 delivers the generated control command 1500 together with the destination information 1200 of IO issue destination to the operating system 104.

Subsequently, the operating system 104 delivers the destination information 1200 and the control command 1500 received from the storage control software 105 to the IO issue control part 210, generates the IO frame 1300, and issues an IO to a logical volume in the storage device 110.

The disk control device 111 writes the control command 1500 received from the host computer 100 into the control memory 114. The control command execution control part 500 transmits the control command to the judged logical volume of operation object and executes the control command on the basis of a value set in the control command transfer destination logical volume number 1520 in the control command 1500 written into the control memory 114.

In the example shown in FIG. 16, a logical volume of operation object is an unrecognized volume and the control command 1500 is issued to a logical volume 1600. The disk control device 111 refers to a field (the control command transfer destination logical volume number 1520) which specifies a transfer destination logical volume in the control command 1500, recognizes that the operation object is the logical volume 1610, transfers the control command not to the logical volume 1600 of control command issue destination but to the logical volume 1610 of operation object, and executes the control command.

A procedure used by the control command generation function part 370 will now be described in detail with reference to FIG. 26.

(3.2 Control Command Generation Processing Procedure)

Figure 26:
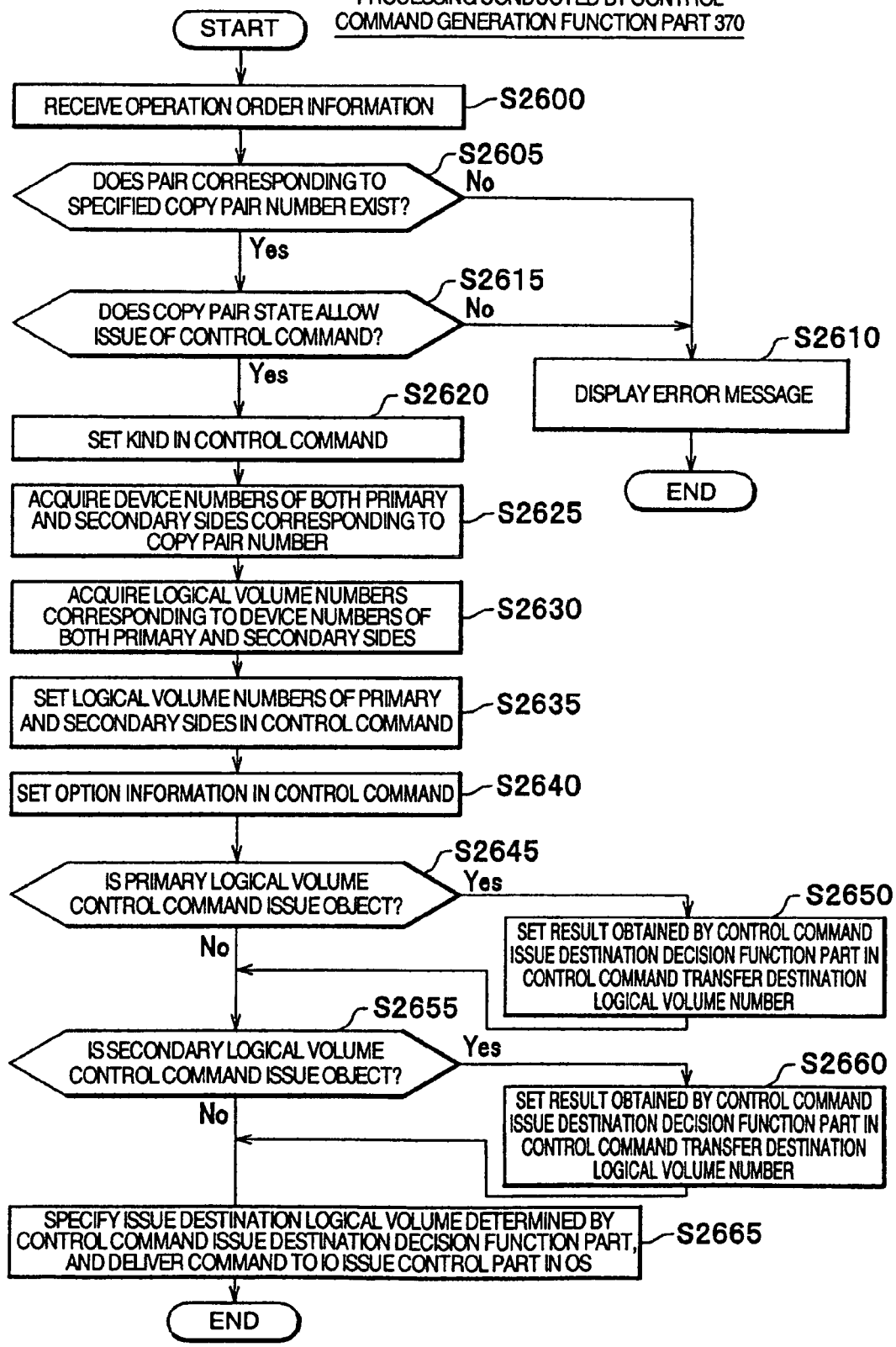
FIG. 26 is a flow chart showing processing conducted by a control command generation function part.

FIG. 26 is a flow chart showing processing conducted by the control command generation function part. The flow chart will now be described with reference to FIGS. 11, 12 and 15 as occasion demands. As shown in FIG. 16, the control command generation function part 370 in the control command issue control part 360 conducts processing in which the storage control software 105 receives the operation order information 1100 from the terminal 120 and generates the control command 1500 and the destination information 1200 which indicates the issue destination of the control command.

First, the control command generation function part 370 receives the operation order information 1100 for copy pair operation (see FIG. 11) input by the storage administrator from the terminal 120 (step S2600). And the control command generation function part 370 confirms whether a record (pair) corresponding to the specified copy pair number exists in the copy pair information table 320 (see FIG. 9) corresponding to the copy group number specified in the operation order information 1100 (step S2605). If a coinciding record is not found as a result of the confirmation at the step S2605 (no at the step S2605), then the control command generation function part 370 displays a message which indicates an error (step S2610) and finishes the processing.

On the other hand, if the pertinent copy pair record is found as a result of the confirmation at the step S2605 (yes at the step S2605), the control command generation function part 370 checks the copy pair state of the pertinent record and confirms whether the copy pair state allows issue of a control command of a specified operation classification (step S2615).

If the copy pair state does not allow issue of the control command of the specified operation classification (no at the step S2615), then the control command generation function part 370 displays a message which indicates an error (step S2610) and finishes the processing. Here, the copy pair state which does not allow issue of the control command is, for example, a state which orders a copy pair in an unformed state to temporarily stop (suspend).

If the decision at the step 2615 is the copy pair state which allows command issue (yes at the step S2615), then the control command generation function part 370 sets the specified operation classification in the kind 1510 in the control command 1500 (see FIG. 15) (step S2620).

Subsequently, the control command generation function part 370 acquires device numbers of both the primary and secondary sides from the record corresponding to the specified copy pair number in the copy pair information table 320 (step S2625). In addition, the control command generation function part 370 acquires logical volume numbers respectively corresponding to the acquired device numbers from the disk information table (see FIG. 7) (step S2630), and sets the logical volume numbers respectively in the logical volume numbers of the primary and secondary sides in the control command 1500 (step S2635). If the operation order information 1100 has option information set therein, the control command generation function part 370 sets the specified value in the option 1550 in the control command (step S2640).

Subsequently, the control command generation function part 370 must make a decision whether the logical volume of the control command issue object is the primary side, the secondary side, or both sides according to the classification of the control command 1500. The reason why the logical volume of the control command issue object must be determined according to the classification of the control command 1500 is that, for example, a copy start command for backup must be issued to the primary logical volume and an order of copy reverse transfer must be issued to the secondary logical volume to restore backup data for the purpose of recovery from a failure. Furthermore, for acquiring the copy pair state (such as copy progress information), the control command 1500 must be issued to the logical volumes of both the primary and secondary sides.

First, the control command generation function part 370 makes a decision whether the primary logical volume is the control command issue object (step S2645). If the primary logical volume is the logical volume of control command issue object as a result of the decision (yes at the step S2645), then the control command generation function part 370 sets a value in the control command transfer destination logical volume number 1520 according to a result obtained by the control command issue destination decision function part 380 (step S2650) and proceeds to step S2655. If the primary logical volume is not the logical volume of the control command issue object as the result of the decision (no at the step S2645), then the control command generation function part 370 proceeds to step S2655.

Subsequently, the control command generation function part 370 makes a decision whether the secondary logical volume is the control command issue object (step S2655). This is processing similar to that in the case of the primary logical volume. In other words, if the secondary logical volume is the logical volume of the control command issue object as the result of the decision (yes at the step S2655), then the control command generation function part 370 sets a value in the control command transfer destination logical volume number 1520 according to the result obtained by the control command issue destination decision function part 380 (step S2660), and proceeds to step S2665. If the secondary logical volume is not the logical volume of the control command issue object as the result of the decision (no at the step S2655), then the control command generation function part 370 proceeds to the step S2665. If the control command is issued to both the primary and secondary sides, however, the control command for the secondary side is duplicated from the control command for the primary side when the secondary logical volume is the control command issue object.

The control command generation function part 370 sets information of the control command issue destination logical volume determined by the control command issue destination decision function part 380 in the destination information 1200, and delivers the information of the control command issue destination logical volume together with the generated control command 1500 to the IO issue control part 210 in the operating system 104 (step S2665). As shown in FIG. 12, the destination information 1200 is the device number used by the operating system 104 to manage the logical volume. When issuing a command to logical volumes of both the primary and secondary sides, this operation is conducted twice.

A procedure for judging the control command issue destination logical volume to conduct copy processing will now be described with reference to FIGS. 17 to 22 and FIG. 27.

(3.3 Control Command Issue Destination Decision Processing Procedure)

The control command issue destination decision function part 380 (see FIG. 3) judges a logical volume of control command issue destination to be set in the destination information 1200 in the processing in which the storage control software 105 generates the control command as shown in FIG. 16.

FIGS. 17 to 22 show combinations of logical volumes according to whether logical volumes forming the copy pair and copy group are logical volumes recognized by the operating system 104. Although all copy pairs in the record 31A (see FIG. 8) are not illustrated in FIGS. 17 to 22, the configuration of the copy pair shown in the copy pair information table 320 (see FIG. 9) will be described with reference to FIGS. 17 to 22. Furthermore, copy group expression is omitted in FIGS. 17 to 19.

Figure 17:
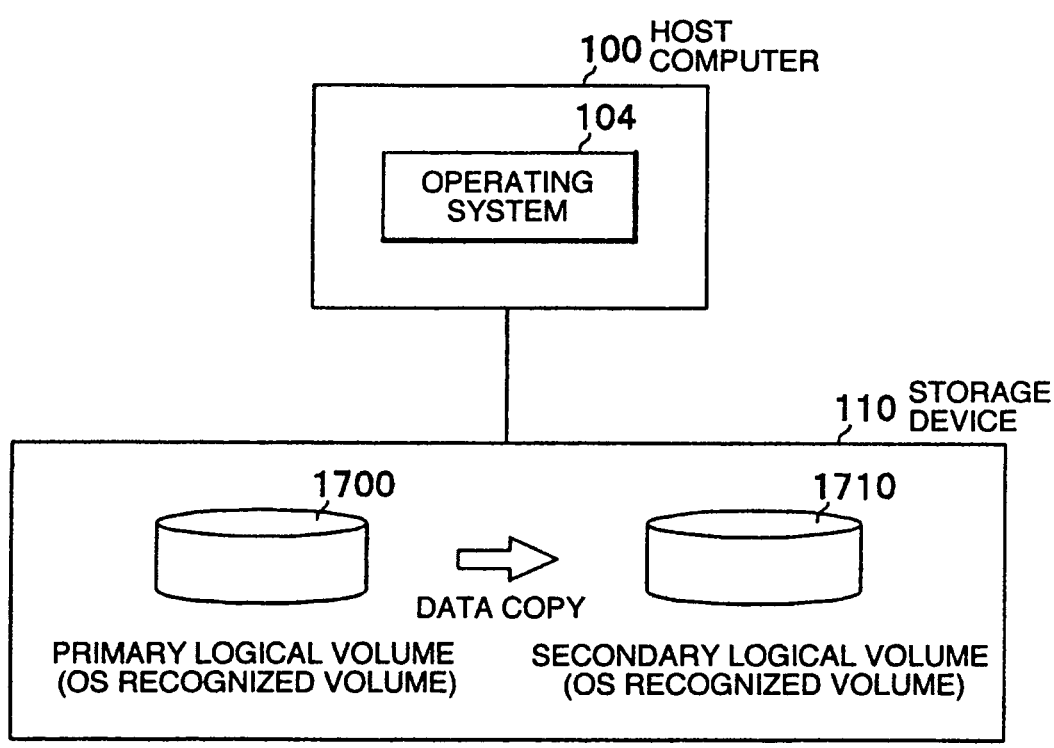
FIG. 17 is a diagram showing a copy pair configuration formed of recognized volumes.

FIG. 17 is a diagram showing a copy pair configuration formed of recognized volumes. In the disk information table 300 (see FIG. 7), both OS recognition flags 304 of the corresponding logical volume are set to "Y." This corresponds to the record 32A having the copy pair number "0001" in the copy pair information table 320 (see FIG. 9). In other words, the OS recognition flags 304 of both the primary device number "1001" and the secondary device number "1004" are "Y." In this configuration, the operating system 104 can issue the control command directly to a primary logical volume 1700 and a secondary logical volume 1710.

Figure 18:
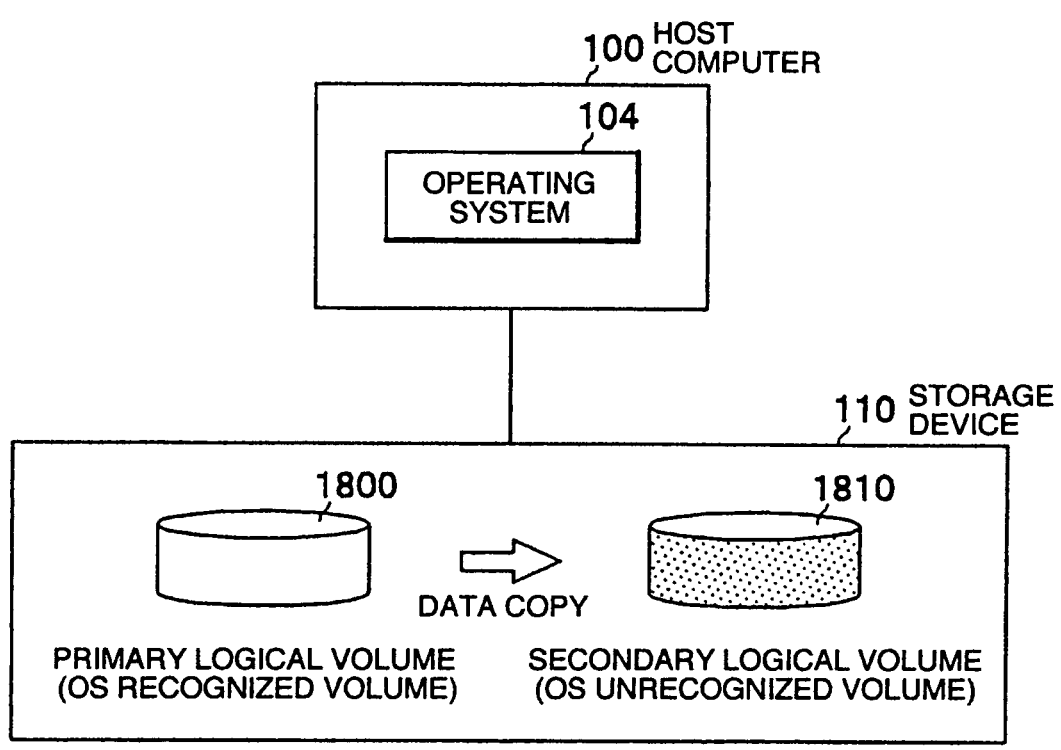
FIG. 18 is a diagram showing a copy pair configuration in which the primary side is a recognized volume and the secondary side is an unrecognized volume.

FIG. 18 is a diagram showing a copy pair configuration in which the primary logical volume is a recognized volume and the secondary logical volume is an unrecognized volume. In the disk information table 300 (see FIG. 7), the primary logical volume has the OS recognition set to "Y" and the secondary logical volume has the OS recognition flag set to "N." This corresponds to a record 32B having a copy pair number "0002" in the copy pair information table 320 (see FIG. 9). In other words, the OS recognition flag 304 of the primary device number "1002" is "Y," whereas the OS recognition flag 304 of the secondary device number "7701" is "N." In this configuration, the operating system 104 can issue the control command directly only to a logical volume 1800. However, the operating system 104 cannot issue the control command directly to a logical volume 1810.

Figure 19:
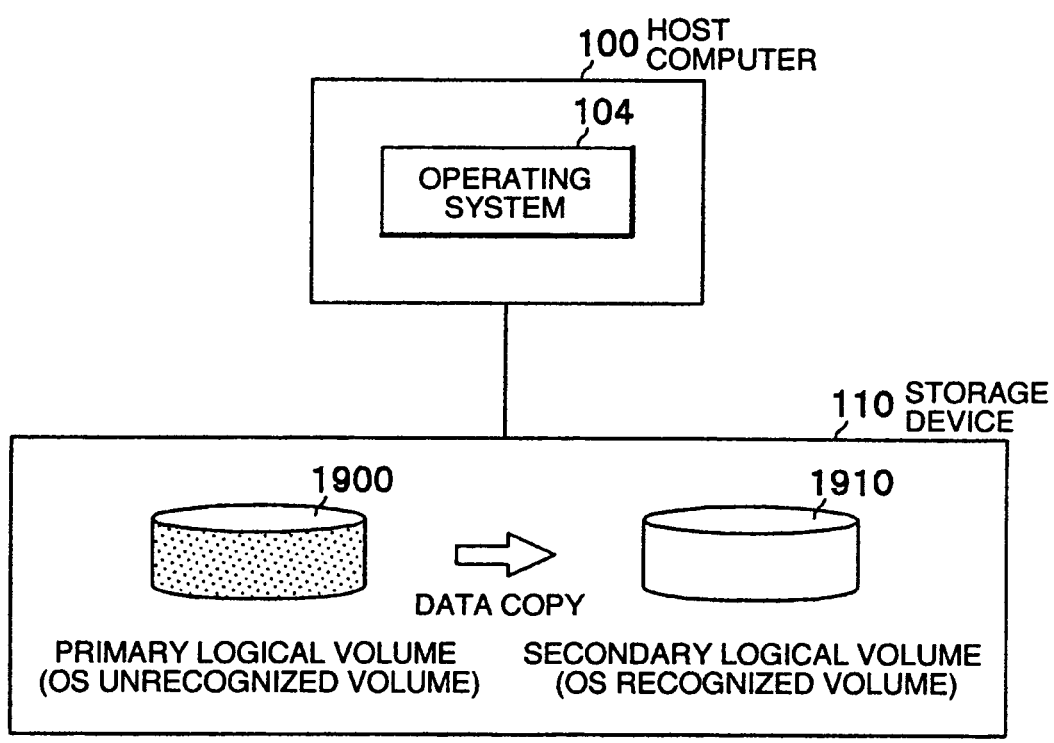
FIG. 19 is a diagram showing a copy pair configuration in which the primary side is an unrecognized volume and the secondary side is a recognized volume.

FIG. 19 is a diagram showing a copy pair configuration in which the primary logical volume is an unrecognized volume and the secondary logical volume is a recognized volume. In the disk information table 300 (see FIG. 7), the primary logical volume has the OS recognition set to "N" and the secondary logical volume has the OS recognition flag set to "Y." This corresponds to a record 32C having a copy pair number "0003" in the copy pair information table 320 (see FIG. 9). In other words, the OS recognition flag 304 of the primary device number "7702" is "N," whereas the OS recognition flag 304 of the secondary device number "1003" is "Y." In this configuration, the operating system 104 cannot issue the control command directly to a logical volume 1900. However, the operating system 104 can issue the control command directly only to a logical volume 1910.

Figure 20:
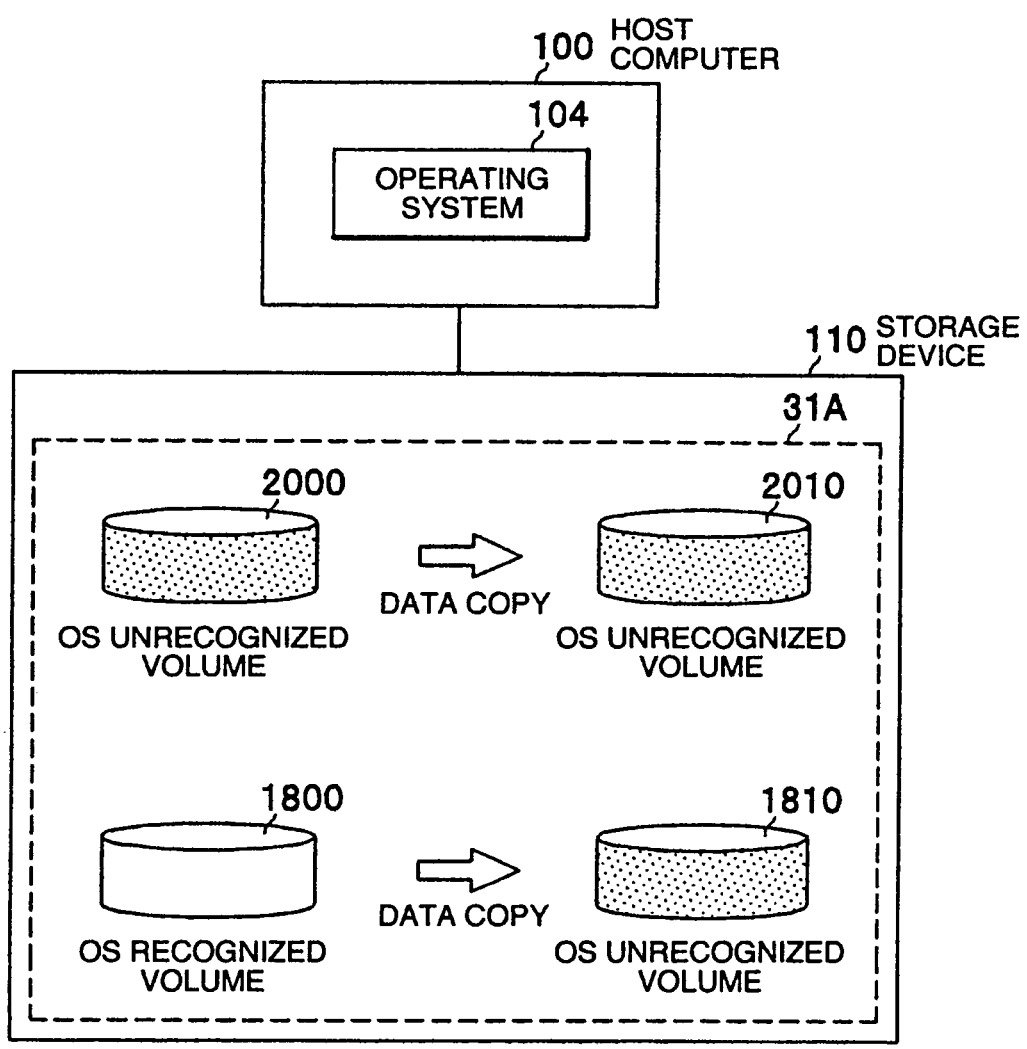
FIG. 20 is a diagram showing a configuration in which an operation object is a copy pair of unrecognized volumes and a recognized volume is included in the same copy group.

FIG. 20 is a diagram showing a configuration in which the operation object is a copy pair formed of unrecognized volumes and there are recognized volumes in the same copy group. Specifically, FIG. 20 shows a configuration in which the operation object is a logical volume 2000, both the logical volume 2000 and a logical volume 2010 in the copy pair of operation object are unrecognized volumes, and a recognized volume exists in another copy pair in the record 31A. In the disk information table 300 (see FIG. 7), both the primary and secondary logical volumes in the copy pair of operation object have the OS recognition flags set to "N." This corresponds to a record 32D having a copy pair number "0004" in the copy pair information table 320 (see FIG. 9). In other words, the OS recognition flag 304 of the primary device number "7703" and the secondary device number "7704" is "N." In this configuration, the operating system 104 cannot issue the control command directly to the primary and secondary logical volumes in the operation object copy pair.

Figure 21:
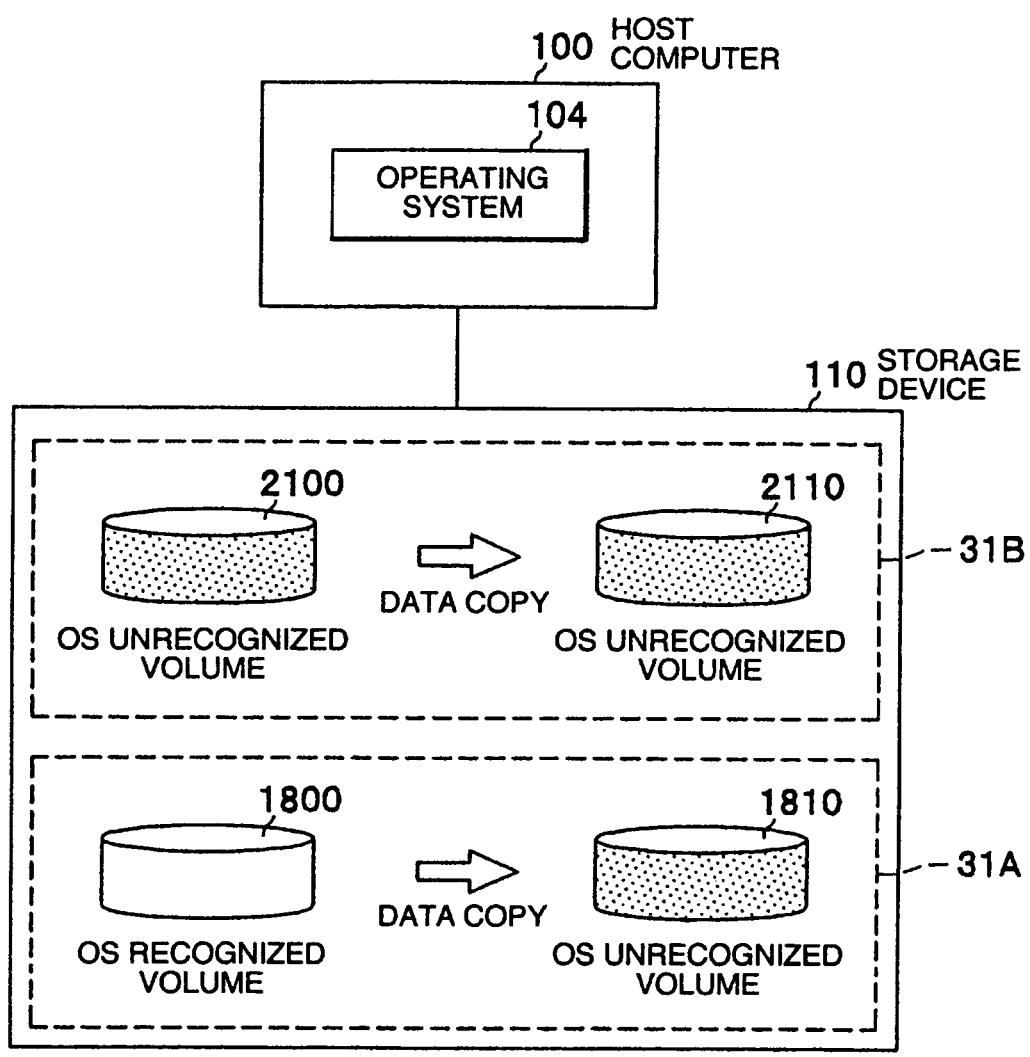
FIG. 21 is a diagram showing a configuration in which an operation object is a copy pair of unrecognized volumes, any recognized volume is not included in the same copy group, and a recognized volume is included in another copy group.

FIG. 21 is a diagram showing a configuration in which the operation object is a copy pair formed of unrecognized volumes and there are not recognized volumes in the same copy group, but there are recognized volumes in another copy group. Specifically, FIG. 21 shows a configuration in which the operation object is a logical volume 2100, both the logical volume 2100 and a logical volume 2110 in the copy pair of operation object are unrecognized volumes, a recognized volume does not exist in the record 31B in the pertinent copy group, and a recognized volume exists in the record 31A which is another copy group and to which the logical volume of operation object does not belong. In the disk information table 300 (see FIG. 7), both the primary and secondary logical volumes in the copy pair of operation object have the OS recognition flags set to "N." This corresponds to a record 32E having a copy pair number "0001" in the copy pair information table 320b (see FIG. 10). In other words, the OS recognition flag 304 of the primary device number "7705" and the secondary device number "7706" is "N." In this configuration, the operating system cannot issue the control command directly to the primary and secondary logical volumes in the operation object copy pair.

Figure 22:
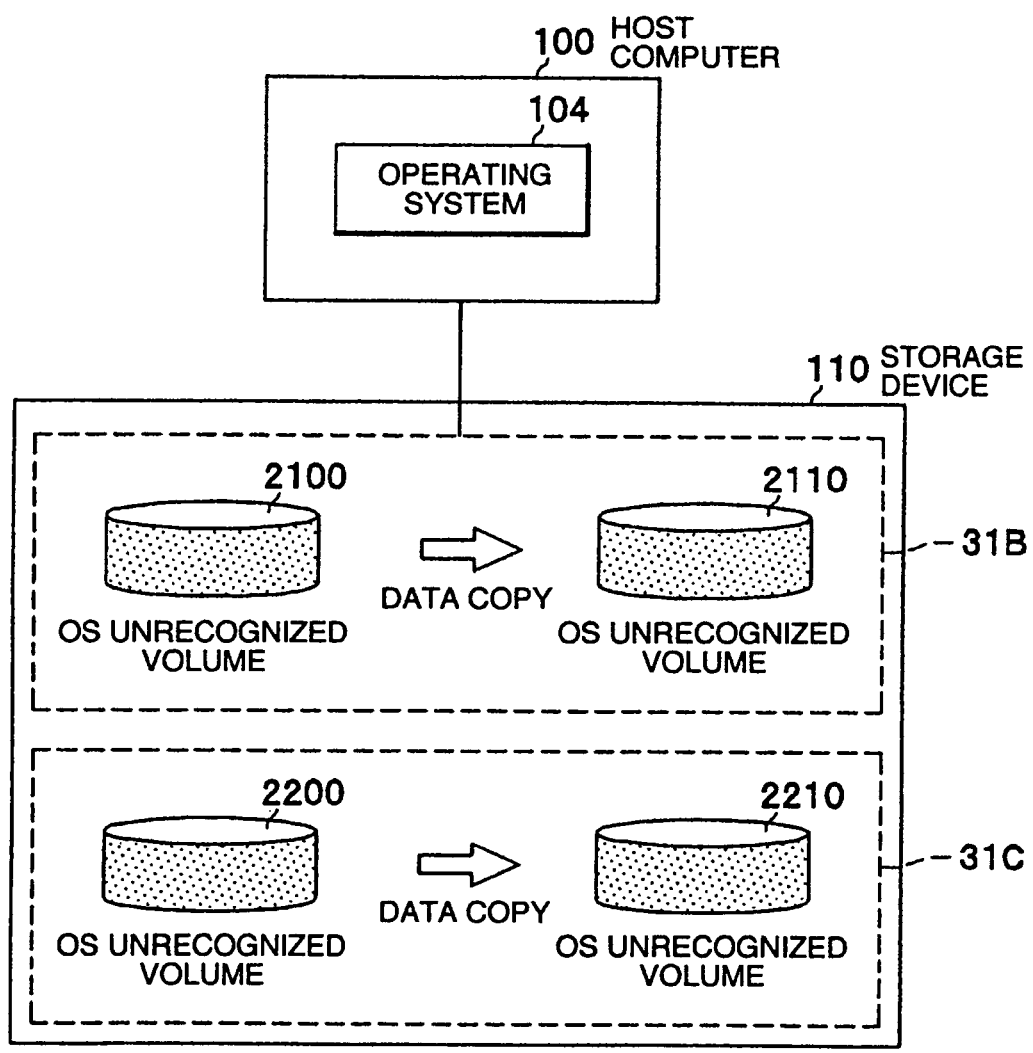
FIG. 22 is a diagram showing a configuration in which an operation object is a copy pair of unrecognized volumes and any recognized volume is not included in every copy group.

FIG. 22 is a diagram showing a configuration in which the operation object is a copy pair formed of unrecognized volumes and there are no recognized volumes in all copy groups. Specifically, FIG. 22 shows a configuration in which the operation object is a logical volume 2200, both the logical volume 2200 and a logical volume 2210 in the copy pair of operation object are unrecognized volumes, a recognized volume does not exist in the record 31B in the pertinent copy group, and a recognized volume does not exist in the record 31C which is another copy group and to which the logical volume of operation object does not belong. In the disk information table 300 (see FIG. 7), both the primary and secondary logical volumes in the copy pair of operation object have the OS recognition flags set to "N." This corresponds to a record 32F having a copy pair number "0001" in the copy pair information table 320c (see FIG. 10). In other words, the OS recognition flag 304 of the primary device number "7707" and the secondary device number "7708" is "N." In this configuration, the operating system 104 cannot issue the control command directly to the primary and secondary logical volumes in the operation object copy pair.

The control command issue destination decision processing procedure will now be described.

Figure 27:
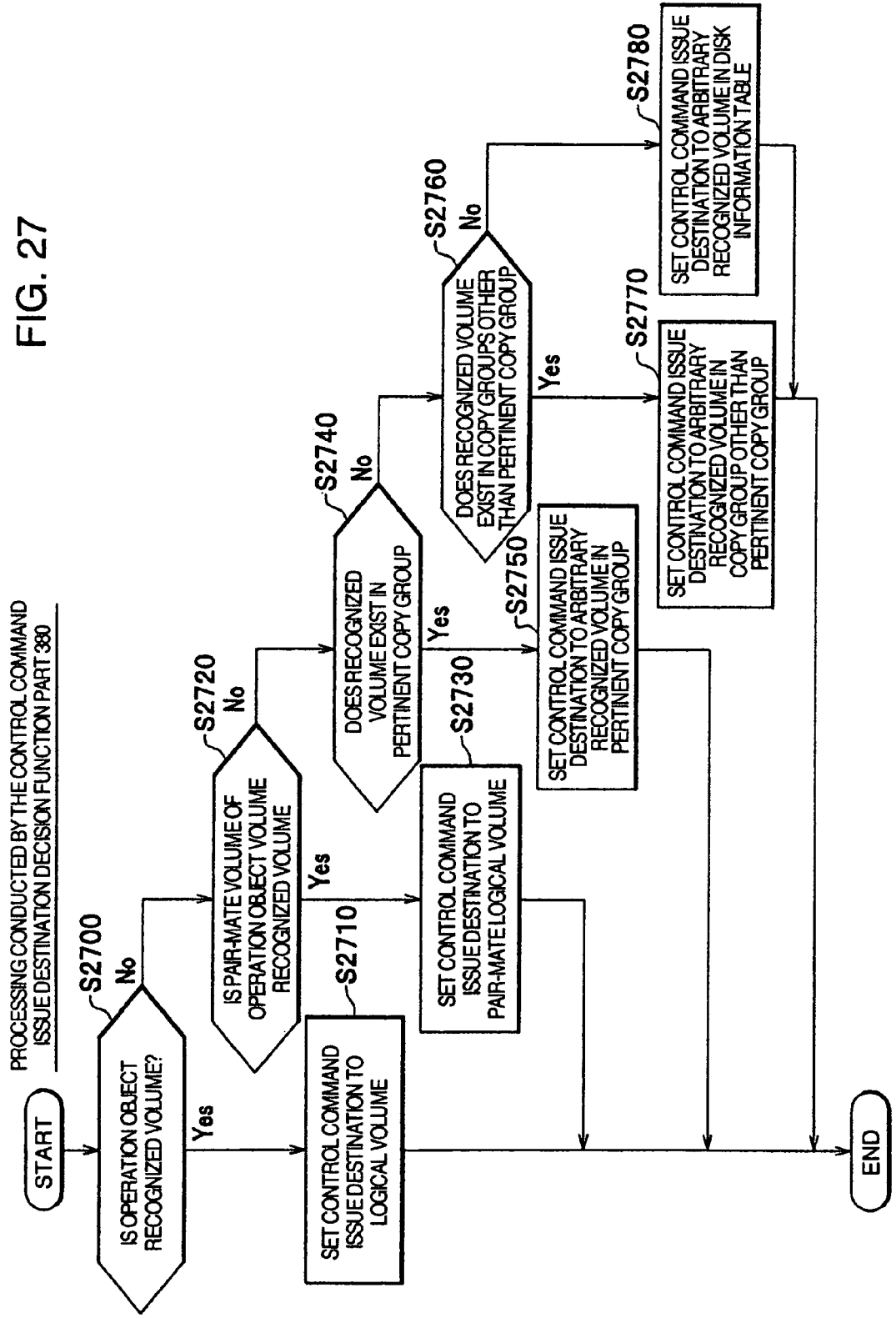
FIG. 27 is a flow chart showing processing conducted by a control command issue destination decision function part.

FIG. 27 is a flow chart showing processing conducted by the control command issue destination decision function part. First, at the step S2645 and the step S2655 (see FIG. 26) in the processing conducted by the control command generation function part 370 (see FIG. 3), the control command issue destination decision function part 380 refers to a value of the OS recognition flag set in a corresponding record in the disk information table 300 with respect to the determined logical volume of control command issue object, and confirms whether the operation object is a recognized volume (step S2700).

If the OS recognition flag has a value "Y" and the operation object is a recognized volume as a result of the confirmation at the step S2700 (yes at the step S2700), then the control command issue destination decision function part 380 sets the control command issue destination to the logical volume of control command issue object (step S2710), and finishes the processing. In this case, the control command transfer destination logical volume number in the control command 1500 is not set by the control command generation function part 370.

On the other hand, if the OS recognition flag has a value "N" and the operation object is an unrecognized volume (no at the step S2700), then the control command cannot be issued directly to the logical volume of operation object.

Therefore, it is confirmed whether the logical volume of operation object and its pair-mate volume are recognized volumes (step S2720).

If the mate volume which forms a pair with the logical volume of operation object has "Y" as the value of the OS recognition flag and the mate volume is a recognized volume as a result of the confirmation at the step S2720 (yes at the step S2720), then the control command issue destination is set to the pair-mate logical volume (step S2730) and the processing is finished. In this case, the control command generation function part 370 sets the unrecognized volume number of operation object in the control command transfer destination logical volume number in the control command 1500.

If the mate volume which forms the pair with the logical volume of operation object has "N" as the value of the OS recognition flag and the mate volume is an unrecognized volume (no at the step S2720), then it is confirmed whether a logical volume (recognized volume) to which the control command can be issued directly exists in a copy group to which the logical volume of operation object belongs (step S2740).

If a recognized volume which has "Y" as the OS recognition flag and to which the control command can be issued directly exists in the copy group to which the logical volume of operation object belongs, as a result of the confirmation at the step S2740 (yes at the step S2740), then the control command issue destination is set to the found recognized volume (arbitrary recognized volume) in the copy group to which the logical volume of operation object belongs (step S2750), and the processing is finished. As for a method for selecting the recognized volume, for example, it is conceivable to conduct retrieval from the head of the copy pair table for the pertinent copy group and select a recognized volume found first. In this case, the control command generation function part 370 sets the unrecognized volume number of operation object in the control command transfer destination logical volume number in the control command 1500.

If a recognized volume to which the control command can be issued directly does not exist in the copy group to which the logical volume of operation object belongs (no at the step S2740), then it is confirmed whether a recognized volume exists in another copy group to which the logical volume of operation object does not belong (step S2760).

If a recognized volume which has "Y" as the OS recognition flag and to which the control command can be issued directly exists in the copy group to which the logical volume of operation object does not belong, as a result of the confirmation at the step S2760 (yes at the step S2760), then the control command issue destination is set to the found recognized volume (arbitrary recognized volume) in the copy group to which the logical volume of operation object does not belong (step S2770), and the processing is finished. In this case, the control command generation function part 370 sets the unrecognized volume number of operation object in the control command transfer destination logical volume number in the control command 1500.

If a recognized volume to which the control command can be issued directly does not exist in the copy group to which the logical volume of operation object does not belong, either (no at the step S2760), then the control command issue destination is set to an arbitrary recognized volume in the disk information table 300 (step S2780) and the processing is finished. In this case, the control command generation function part 370 sets the unrecognized volume number of operation object in the control command transfer destination logical volume number 1520 in the control command 1500.

For conducting operation on a logical volume which is not recognized by the operating system 104 and to which the control command 1500 cannot be issued directly, the control command issue destination is thus selected by utilizing the definition retained by the storage control software 105 for the purpose of backup.

Finally, the judgment of the control command issue destination in the case where the above-described processing procedure is applied to the configurations shown in FIGS. 17 to 22 will further be described.

In the configuration shown in FIG. 17, both the primary side and the secondary side are recognized volumes. On the basis of the decision "yes" at the step S2700 in FIG. 27, therefore, the control command is issued directly to both the primary and the secondary logical volumes to operate them.

In the configuration shown in FIG. 18, the primary side is a recognized volume. On the basis of the decision "yes" at the step S2700 in FIG. 27, therefore, the control command is issued directly to the primary logical volume to operate it. On the other hand, the secondary side is an unrecognized volume. On the basis of the decision "yes" at the step S2720 in FIG. 27, therefore, the control command is issued to the primary logical volume and transferred to the secondary logical volume to operate the secondary logical volume.

In the configuration shown in FIG. 19, the primary side is an unrecognized volume and the secondary side is a recognized volume. On the basis of the decision "yes" at the step S2720 in FIG. 27, therefore, the control command is issued to the secondary logical volume and transferred to the primary logical volume to operate the primary logical volume. On the other hand, the secondary side is the recognized volume. On the basis of the decision "yes" at the step S2700 in FIG. 27, therefore, the control command is issued directly to the secondary logical volume to operate the secondary logical volume.

In the configuration shown in FIG. 20, the copy pair including the logical volume of operation object 2000 is formed of unrecognized volumes. However, the logical volume 1800 in the other copy pair in the record 31A which is the same copy group is a recognized volume. On the basis of the decision "yes" at the step S2740 in FIG. 27, therefore, the control command is issued to the logical volume 1800 and transferred to the logical volume of operation object 2000 to operate the object logical volumes.

In the configuration shown in FIG. 21, a recognized volume does not exist in the record 31B of the copy group to which the logical volume of operation object 2100 belongs, and the logical volume 1800 exists in the record 31A which is another copy group. On the basis of the decision "yes" at the step S2760 in FIG. 27, therefore, the control command is issued to the logical volume 1800 and transferred to the logical volume of operation object 2100 to operate the object logical volumes.

In the configuration shown in FIG. 22, a recognized volume does not exist in any copy group. On the basis of the decision "no" at the step S2760 in FIG. 27, therefore, the control command is issued to a recognized volume which is not used in copy group definition and selected arbitrarily from the disk information table 300 (see FIG. 7), and transferred to the logical volume of operation object 2200 to operate the object logical volumes.

As shown in the processing procedure in FIG. 27, the control command issue destination for operating an unrecognized volume is retrieved in the order of copy pair, copy group and disk information, i.e., in the broadening order of definition range in the definition information contained in the storage control software 105. In the description of the present embodiment, definition information of the copy pair and copy group is used. Alternatively, definition of collection of a plurality of copy groups may also be used. Definition information to be used is not restricted to that in the present embodiment.

An IO issue processing procedure used by the IO issue control part 210 in the operating system will now be described with reference to FIG. 28.

(3.4 IO Issue Processing Procedure)

Figure 28:
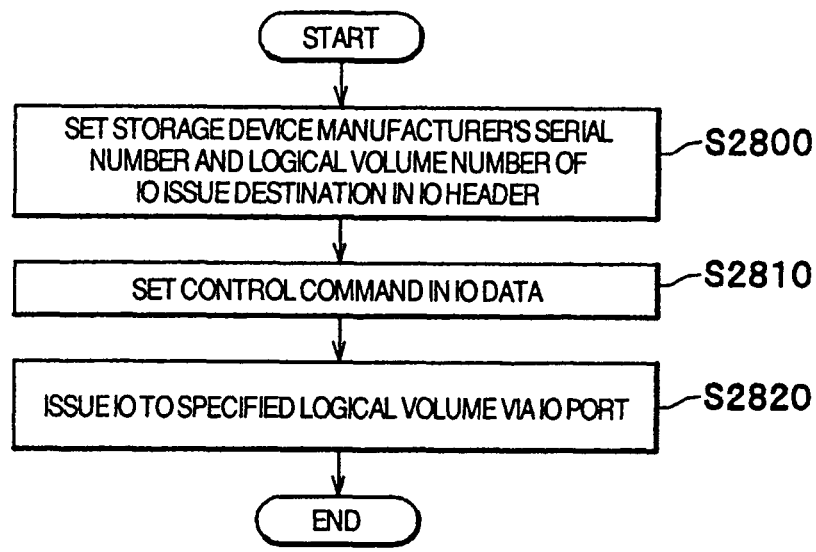
FIG. 28 is a flow chart showing processing conducted by an IO issue control part.

FIG. 28 is a flow chart showing processing conducted by the IO issue control part. The flow chart will now be described with reference to FIGS. 13 and 14 as occasion demands. The IO issue control part 210 conducts processing in which the operating system 104 generates the IO frame 1300 (see FIG. 13) and transmits the IO frame 1300 to the storage device 110 in FIG. 16.

First, the IO issue control part 210 in the operating system 104 acquires a storage device manufacturer's serial number and a logical volume number from the device information table 200 on the basis of a value of the device number in the destination information 1200 received from the storage control software 105, and sets the values in the IO header 1400 (step S2800). Subsequently, the IO issue control part 210 sets the control command 1500 received from the storage control software 105 in the IO data 1310 in the IO frame 1300 (step S2810). Upon generating the IO frame 1300, the IO issue control part 210 issues an IO having a logical volume in the storage device as its destination via the IO port 102 (step S2820) and finishes the processing.

(3.5 Control Command Execution Processing Procedure)

Figure 29:
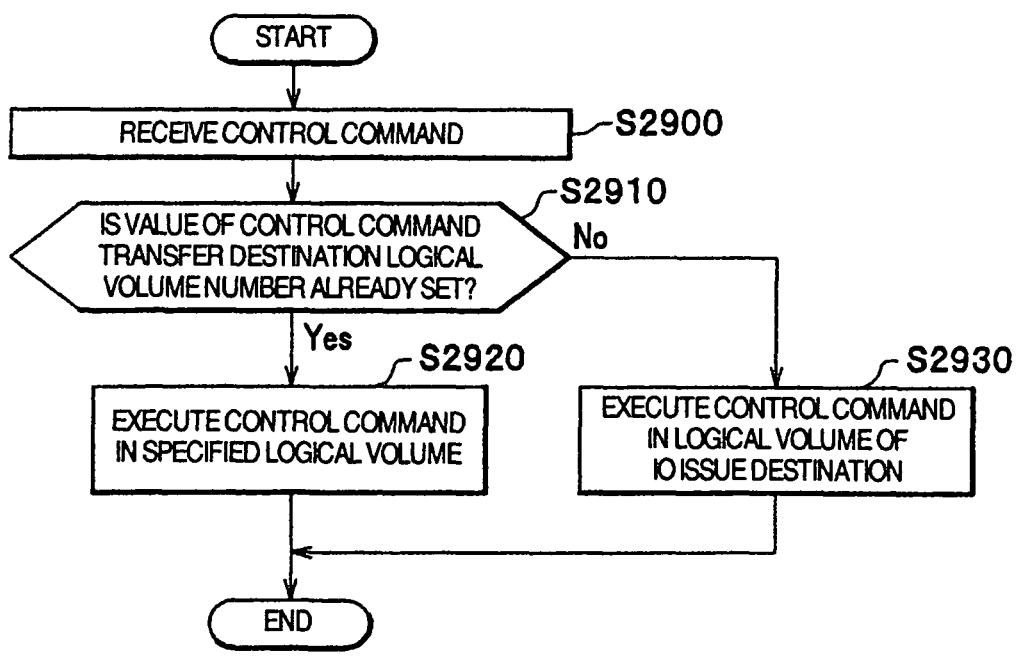
FIG. 29 is a flow chart showing processing conducted by a control command execution control part.

FIG. 29 is a flow chart showing processing conducted by the control command execution control part. The control command execution control part 500 is operated by the processor 113 (see FIG. 1) in FIG. 16 to judge the logical volume of operation object of the control command written into the control memory 114, transmit the control command 1500 to the object logical volume, and execute the control command 1500.

First, the control command 1500 issued by the host computer 100 is received by the disk control device 111 via the port 112 and written into the control memory 114. As a result, the control command 1500 is delivered to the control command execution control part 500. Upon receiving the control command (step S2900), the control command execution control part 500 confirms whether the value of the control command transfer destination logical volume number 1520 in the control command 1500 is already set (step S2910).

If the value of the control command transfer destination logical volume number 1520 (see FIG. 15) is empty (no specification) as a result of the confirmation at the step S2910 (no at the step S2910), then the control command execution control part 500 transmits the control command to a logical volume (of control command issue destination) specified by the IO header 1400 in the IO frame 1300 and executes the control command (step S2930), and finishes the processing. Execution of the control command in a logical volume specified by the IO header 1400 is intended for a logical volume having "Y" in the OS recognition flag 304 in the disk information table 300 shown in FIG. 7, i.e., a volume recognized by the operating system 104.

On the other hand, if the control command transfer destination logical volume number 1520 has a value set therein (yes at the step S2910), the control command execution control part 500 transfers the control command to the specified logical volume and executes the control command (step S2920) and finishes the processing. Execution of the command in the logical volume specified by the control command transfer destination logical volume number 1520 is intended for a logical volume having "N" in the OS recognition flag 304 in the disk information table 300, i.e., a volume which is not recognized by the operating system.

In a computer system including a storage device 110 which in turn includes a disk device 117 to provide logical volumes as areas for storing data and a disk control device 111 to control the disk device 117, and a host computer 100 connected to the storage device 110, the present embodiment is a storage device control method used for an operating system in the host computer 100 to conduct copy operation on a logical volume which is included in the storage device 110 and which cannot be recognized.

The host computer 100 previously stores whether a logical volume of operation object is a recognized volume which can be recognized by the operating system or an unrecognized volume which cannot be recognized by the operating system, as disk information (for example, the disk information table 300) (for storing the disk information, for example, the disk information registration function part 330 is used). If an operation order of copy operation is received and an unrecognized volume is specified in the operation order, the host computer executes: a control command issue control step (for example, the control command issue control part 360) of specifying a recognized volume with reference to the disk information and determining an issue destination of a control command and issuing the control command with the specified unrecognized volume set as a logical volume of transfer destination of the control command; and a backup command issue control step (for example, the IO issue control part 210) of issuing a backup command which contains the issue destination of the control command and the transfer destination of the control command, and transmitting the backup command to the storage device.

The disk control device 111 in the storage device 110 refers to the received backup command. If the logical volume of transfer destination of the control command is specified in the backup command, then the disk control device 111 executes a control command execution step (for example, the control command execution control part 500) of executing operation of the operation order on the logical volume of transfer destination of the control command.

In addition, the host computer 100 previously stores logical volumes which become copy objects, as copy pair information of pairs each formed of a first logical volume (for example, a volume of operation object) and a second logical volume (for example, a pair mate volume of the volume of operation object) (for storing the copy pair information, for example, the copy pair definition function part 350 is used). And the control command issue control step includes a decision step (for example, the control command issue destination decision function part 380) of making a decision whether each of the first logical volume and the second logical volume is a recognized volume or an unrecognized volume by referring to the disk information and the copy pair information.

The storage device control method further includes a copy group definition step (for example, the copy group definition function part 340) of defining copy group information of groups each obtained by collecting a plurality of the copy pair information pieces. If a result of the decision at the decision step (for example, the control command issue destination decision function part 380) indicates that both the first logical volume and the second logical volume are unrecognized volumes, then the host computer 100 specifies a recognized volume existing in the copy group information as the issue destination of the control command and specifies logical volumes of the operation object, as the transfer destination of the control command.

The host computer 100 defines two different copy group information pieces as first copy group information and second copy group information at the copy group definition step. If a result of the decision at the decision step (for example, the control command issue destination decision function part 380) indicates that both the first logical volume and the second logical volume of operation object in the first copy group information are unrecognized volumes, and a recognized volume does not exist in the first copy group information, then the host computer specifies a recognized volume existing in the second copy group information as the issue destination of the control command and specifies the logical volumes of the operation object as the transfer destination of the control command.

In the present embodiment, the host computer 100 manages the storage device 110. The storage device 110 includes the disk device 117 which provides logical volumes and the disk control device 111 which controls the disk device 117. The host computer 100 issues a control command to a recognized volume in the disk control device 111. The disk control device 111 operates a recognized volume which is an issue destination of the control command or an unrecognized volume contained in the control command. A logical volume to which the control command is to be issued from the host computer 100 is determined by using definition information (the disk information table, the copy pair information table, or the copy group information table) concerning copy operation retained by storage control software 105 which operates on the host computer.

According to the present embodiment, operation such as copy start can be conducted on an unrecognized volume by using definition relating to copy operation retained by conventional storage control software, in a computer system including a host computer and a storage device.

Furthermore, by operating an unrecognized volume, it is possible to construct a backup system including recognized volumes and unrecognized volumes mixedly and reduce the operation cost relating to the backup.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage device control method, in a computer system including a storage device and a host computer having an operating system,
    wherein the storage device includes a disk device to provide logical volumes as areas for storing data and a disk control device to control the disk device,
    wherein the host computer is coupled to the storage device via a communication line, the method comprising the host computer executing the steps of:
    (A) storing disk information which indicates whether a logical volume of a copy operation object is a recognized volume which is recognized by the operating system or an unrecognized volume which is not recognized by the operating system;
    (B) storing copy pair information which indicates a copy operation pair between logical volumes, and a pair state of the copy operation pair,
    (C) receiving an operation order of copy operation for changing or acquiring the pair state of the copy pair, and specifying an operation object logical volume regarding to the operation order;
    (D) determining an issue destination of a control command to be transmitted for the received operation order, by:
    (D1) determining whether the specified logical volume in (C) is recognized or not, based on the disk information;
    (D2) if the specified logical volume in (C) is recognized, setting the issue destination to the specified logical volume in (C);
    (D3) if the specified logical volume in (C) is unrecognized, performing:
    (D3a) further determining that a pair-mate logical volume of the specified logical volume in (C) is recognized, based on the disk information;
    (D3b) if the pair-mate logical volume is recognized, setting the issue destination to a logical volume which is copy-paired to the specified logical volume in (C), and setting a transfer destination in the control command to the specified logical volume in (C); and
    (E) transmitting the control command for the specified logical volume in (C), to the issue destination logical volume via the communication line, and
    wherein the method further comprises the disk control device executing the steps of:
    (1) receiving the control command to the issue destination volume;
    (2) executing a processing for the changing or acquiring the pair state to:
    (2a) the issue destination logical volume, if the transfer destination in the control command is unset;
    (2b) a logical volume indicated by the transfer destination of the control command, if the transfer destination in the control command is set.

2. The storage device control method according to claim 1, the method further comprising the host computer executing the steps of:
    (F) storing copy group information which indicates a group of copy pairs,
    (D3c) if the pair-mate logical volume is unrecognized, setting the issue destination to a recognized logical volume which is included in the copy group including the specified logical volume in (C), and setting the transfer destination in the control command to the specified logical volume in (C).

3. The storage device control method according to claim 2, the method further comprising the host computer executing the steps of:
    (D3d) if all of logical volumes in the copy group including the specified logical volume in (C) are unrecognized, setting the issue destination to a recognized logical volume outside the copy group including the specified logical volume in (C) but in the storage device, and setting the transfer destination in the control command to the specified logical volume in (C).

4. The storage device control method according to claim 1, wherein both of the logical volumes in the copy pair are provided in one storage device.

5. The storage device control method according to claim 1, wherein the communication line is also used by data transfer from a business application in the host computer.

6. A computer system comprising a storage device and a host computer having an operating system,
    wherein the storage device includes a disk device to provide logical volumes as areas for storing data and a disk control device to control the disk device, wherein the host computer is coupled to the storage device via a communication line, the host computer configured to perform the steps of:

(A) storing disk information which indicates whether a logical volume of a copy operation object is a recognized volume which is recognized by the operating system or an unrecognized volume which is not recognized by the operating system;

(B) storing copy pair information which indicates a copy operation pair between logical volumes, and a pair state of the copy operation pair, (C) receiving an operation order of copy operation for changing or acquiring the pair state of the copy pair, and specifying an operation object logical volume regarding to the operation order;

(D) determining an issue destination of a control command to be transmitted for the received operation order, by:

(D1) determining whether the specified logical volume in (C) is recognized or not, based on the disk information;

(D2) if the specified logical volume in (C) is recognized, setting the issue destination to the specified logical volume in (C);

(D3) if the specified logical volume in (C) is unrecognized, performing:

(D3a) further determining that a pair-mate logical volume of the specified logical volume in (C) is recognized, based on the disk information;

(D3b) if the pair-mate logical volume is recognized, setting the issue destination to a logical volume which is copy-paired to the specified logical volume in (C), and setting a transfer destination in the control command to the specified logical volume in (C); and (E) transmitting the control command for the specified logical volume in (C), to the issue destination logical volume via the communication line, and wherein the disk control device is configured to perform the steps of:

(1) receiving the control command to the issue destination volume;

(2) executing a processing for the changing or acquiring the pair state to:

(2a) the issue destination logical volume, if the transfer destination in the control command is unset;

(2b) a logical volume indicated by the transfer destination of the control command, if the transfer destination in the control command is set.

7. The computer system according to claim 6, the host computer further configured to execute the steps of:

(F) storing copy group information which indicates a group of copy pairs, (D3c) if the pair-mate logical volume is unrecognized, setting the issue destination to a recognized logical volume which is included in the copy group including the specified logical volume in (C), and setting the transfer destination in the control command to the specified logical volume in (C).

8. The computer system according to claim 7, the host computer further configured to execute the steps of:

(D3d) if all of logical volumes in the copy group including the specified logical volume in (C) are unrecognized, setting the issue destination to a recognized logical volume outside the copy group including the specified logical volume in (C) but in the storage device, and setting the transfer destination in the control command to the specified logical volume in (C).

9. The computer system according to claim 6,
wherein both of the logical volumes in the copy pair are provided in one storage device.

10. The computer system according to claim 6,
wherein the communication line is also configured to be used by data transfer from a business application in the host computer.

11. A non-transitory computer readable medium storing a storage device control program for operation in a computer system including a storage device and a host computer having an operating system, wherein the storage device includes a disk device to provide logical volumes as areas for storing data and a disk control device to control the disk device, wherein the host computer is coupled to the storage device via a communication line, the program, when executed, causing the host computer to perform the steps of:

(A) storing disk information which indicates whether a logical volume of a copy operation object is a recognized volume which is recognized by the operating system or an unrecognized volume which is not recognized by the operating system;

(B) storing copy pair information which indicates a copy operation pair between logical volumes, and a pair state of the copy operation pair, (C) receiving an operation order of copy operation for changing or acquiring the pair state of the copy pair, and specifying an operation object logical volume regarding to the operation order;

(D) determining an issue destination of a control command to be transmitted for the received operation order, by:

(D1) determining whether the specified logical volume in (C) is recognized or not, based on the disk information;

(D2) if the specified logical volume in (C) is recognized, setting the issue destination to the specified logical volume in (C);

(D3) if the specified logical volume in (C) is unrecognized, performing:

(D3a) further determining that a pair-mate logical volume of the specified logical volume in (C) is recognized, based on the disk information;

(D3b) if the pair-mate logical volume is recognized, setting the issue destination to a logical volume which is copy-paired to the specified logical volume in (C), and setting a transfer destination in the control command to the specified logical volume in (C); and (E) transmitting the control command for the specified logical volume in (C), to the issue destination logical volume via the communication line, and wherein the program, when executed, causing the disk control device to perform the steps of:

(1) receiving the control command to the issue destination volume;

(2) executing a processing for the changing or acquiring the pair state to:

(2a) the issue destination logical volume, if the transfer destination in the control command is unset;

(2b) a logical volume indicated by the transfer destination of the control command, if the transfer destination in the control command is set.

12. The non-transitory computer readable medium according to claim 11, the program, when executed, causing the host computer to perform the steps of:

(F) storing copy group information which indicates a group of copy pairs, (D3c) if the pair-mate logical volume is unrecognized, setting the issue destination to a recognized logical volume which is included in the copy group including the specified logical volume in (C), and setting the transfer destination in the control command to the specified logical volume in (C).

13. The non-transitory computer readable medium according to claim 12, the program, when executed, further causing the host computer to perform the steps of:

(D3d) if all of logical volumes in the copy group including the specified logical volume in (C) are unrecognized, setting the issue destination to a recognized logical volume outside the copy group including the specified logical volume in (C) but in the storage device, and setting the transfer destination in the control command to the specified logical volume in (C).

14. The non-transitory computer readable medium according to claim 11, wherein both of the logical volumes in the copy pair are provided in one storage device.

15. The non-transitory computer readable medium according to claim 11, wherein the communication line is also used by data transfer from a business application in the host computer.

* * * * *